(12) United States Patent
Takahashi et al.

(10) Patent No.: US 12,038,565 B2
(45) Date of Patent: Jul. 16, 2024

(54) OPTICAL SYSTEM, IMAGE PICKUP APPARATUS, IN-VEHICLE SYSTEM, AND MOVING APPARATUS

(71) Applicant: CANON KABUSHIKI KAISHA, Tokyo (JP)

(72) Inventors: Makoto Takahashi, Tochigi (JP); Shuichi Kurokawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 310 days.

(21) Appl. No.: 17/568,263

(22) Filed: Jan. 4, 2022

(65) Prior Publication Data
US 2022/0236533 A1  Jul. 28, 2022

(30) Foreign Application Priority Data
Jan. 27, 2021 (JP) ................................ 2021-011190

(51) Int. Cl.
| | |
|---|---|
| *G02B 13/00* | (2006.01) |
| *B60W 30/08* | (2012.01) |
| *G02B 5/00* | (2006.01) |
| *G06T 7/55* | (2017.01) |
| *H04N 23/55* | (2023.01) |

(52) U.S. Cl.
CPC ......... *G02B 13/0045* (2013.01); *B60W 30/08* (2013.01); *G02B 5/005* (2013.01); *G06T 7/55* (2017.01); *H04N 23/55* (2023.01); *B60W 2420/403* (2013.01); *B60W 2554/80* (2020.02); *G06T 2207/30261* (2013.01)

(58) Field of Classification Search
CPC ...... G02B 13/0045; G02B 5/005; G02B 9/64; G02B 13/06; B60W 30/08; B60W 2420/42; B60W 2554/80; B60W 30/09; B60W 2420/40; G06T 7/55; G06T 2207/30261; H04N 23/55
See application file for complete search history.

(56) References Cited

U.S. PATENT DOCUMENTS

| | | |
|---|---|---|
| 9,517,637 B2 | 12/2016 | Kurokawa |
| 9,860,409 B2 | 1/2018 | Kurokawa |
| 10,663,842 B2 | 5/2020 | Takahashi |
| 11,029,586 B2 | 6/2021 | Takahashi |

(Continued)

FOREIGN PATENT DOCUMENTS

| | | |
|---|---|---|
| JP | 2009-531723 A | 9/2009 |
| JP | 2018-087938 A | 6/2018 |

(Continued)

*Primary Examiner* — Fernando Alcon
(74) *Attorney, Agent, or Firm* — Carter, DeLuca & Farrell LLP

(57) ABSTRACT

An optical system includes a first lens disposed closest to an enlargement conjugate position, a second lens adjacent to the first lens, a diaphragm disposed closer to a reduction conjugate position than the second lens, and a final lens disposed closest to a reduction conjugate position. Each of the first lens, the second lens, and the final lens has an aspherical surface. The aspherical surface of each of the first and second lenses has an inflection point. An imaging magnification is different between a first area of the optical system and a second area on a periphery side of the first area.

21 Claims, 13 Drawing Sheets

(56) References Cited

U.S. PATENT DOCUMENTS

| | | | |
|---|---|---|---|
| 2010/0220229 A1* | 9/2010 | Sano | H04N 25/00 359/764 |
| 2013/0077157 A1* | 3/2013 | Cook | G02B 13/18 359/357 |
| 2015/0207990 A1* | 7/2015 | Ford | G03B 37/00 348/262 |
| 2016/0356997 A1* | 12/2016 | Inomoto | G02B 13/16 |
| 2017/0153430 A1 | 6/2017 | Ijima et al. | |
| 2019/0094490 A1* | 3/2019 | Gyoda | G02B 15/1425 |
| 2020/0077001 A1* | 3/2020 | Nakahara | G03B 5/00 |
| 2020/0133095 A1* | 4/2020 | Cotoros | G02B 27/0006 |
| 2020/0150387 A1* | 5/2020 | Kim | G02B 13/008 |
| 2020/0249347 A1* | 8/2020 | Suzuki | G01B 21/00 |
| 2020/0363613 A1* | 11/2020 | Iwashita | G02B 13/04 |
| 2021/0116786 A1 | 4/2021 | Kurokawa | |
| 2021/0124156 A1 | 4/2021 | Takahashi | |
| 2021/0382282 A1* | 12/2021 | Wenren | G02B 13/009 |
| 2022/0003973 A1* | 1/2022 | Asami | G02B 9/60 |
| 2022/0035140 A1* | 2/2022 | Tan | G02B 3/04 |
| 2022/0050268 A1* | 2/2022 | Dai | G02B 9/64 |
| 2022/0066176 A1* | 3/2022 | Roth | G02B 13/06 |
| 2022/0146790 A1* | 5/2022 | Zou | G02B 13/18 |
| 2022/0206254 A1* | 6/2022 | Wang | G02B 13/0045 |
| 2023/0176336 A1* | 6/2023 | Seo | G03B 30/00 359/708 |
| 2023/0324658 A1* | 10/2023 | Muratani | G02B 13/00 359/676 |
| 2024/0012225 A1* | 1/2024 | Roth | G02B 27/4216 |

FOREIGN PATENT DOCUMENTS

| | | |
|---|---|---|
| JP | 2018-120125 A | 8/2018 |
| WO | 2007/110097 A1 | 10/2007 |

\* cited by examiner

16TH SURFACE CURVATURE CHANGE

17TH SURFACE CURVATURE CHANGE

OPTICAL SYSTEM, IMAGE PICKUP APPARATUS, IN-VEHICLE SYSTEM, AND MOVING APPARATUS

BACKGROUND OF THE INVENTION

Field of the Invention

The present invention relates to an optical system suitable for an image pickup apparatus, such as an in-vehicle camera.

Description of the Related Art

The in-vehicle camera is utilized to acquire image data around a vehicle and to enable a user to visually recognize other vehicles and obstacles. Such an in-vehicle camera often includes a plurality of types of optical systems such as a fisheye lens that realizes a wide field of view although the resolution is low, and a telephoto lens that realizes a high resolution by magnifying a distance although the angle of view is narrow. Japanese Patent Laid-Open Nos. ("JPs") 2018-120125 and 2018-087938 disclose optical systems having a projection characteristic as a combination of characteristics of both the fisheye lens and the telephoto lens.

In the configuration of the optical system disclosed in JP 2018-120125, two surfaces closest to an enlargement conjugate position and a reduction conjugate position are aspherical surfaces. However, the aspherical effect is too small to realize the projection characteristic compatible with both the fisheye lens and the telephoto lens. The optical system disclosed in JP 2018-087938 uses three aspherical lenses. However, the aspherical shapes of these aspherical lenses are not suitable for the projection characteristic compatible with the fisheye lens and the telephoto lens.

SUMMARY OF THE INVENTION

The present invention provides an optical system having a projection characteristic compatible with both a fisheye lens and a telephoto lens, a sufficient angle of view, and a sufficient resolution.

An optical system according to one aspect of the present invention includes a first lens disposed closest to an enlargement conjugate position, a second lens adjacent to the first lens, a diaphragm disposed closer to a reduction conjugate position than the second lens, and a final lens disposed closest to the reduction conjugate position. Each of the first lens, the second lens, and the final lens has an aspherical surface. The aspherical surface of each of the first and second lenses has an inflection point. An imaging magnification is different between a first area of the optical system and a second area on a periphery side of the first area.

An image pickup apparatus according to another aspect of the present invention includes the above optical system, and an image sensor configured to image an object via the optical system. An in-vehicle system according to another aspect of the present invention includes the above image pickup apparatus, and a determiner configured to determine a likelihood of collision between a vehicle and the object based on distance information of the object acquired by the image pickup apparatus. A moving apparatus according to another aspect of the present invention includes the above image pickup apparatus and is movable while holding the image pickup apparatus.

Further features of the present invention will become apparent from the following description of exemplary embodiments with reference to the attached drawings.

DESCRIPTION OF THE EMBODIMENTS

Figure 1:
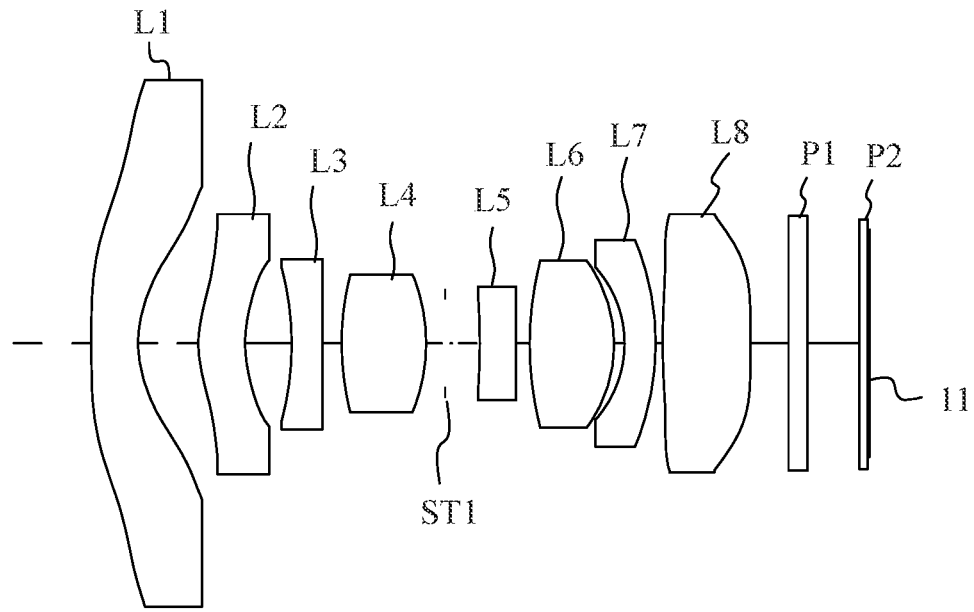
FIG. 1 is a sectional view of an optical system according to Example 1.

Referring now to the accompanying drawings, a description will be given of embodiments according to the present invention. Prior to a specific description of Examples 1 to 4, matters common to each example will be described.

An optical system according to each example is suitable for an image pickup apparatus such as a digital still camera, a digital video camera, an in-vehicle camera, a mobile phone camera, a surveillance camera, a wearable camera, and a medical camera.

FIGS. 1, 3, 5 and 7 illustrate sections that contain an optical axis (dashed line) of optical systems according to Examples 1, 2, 3, and 4, respectively. Each figure illustrates a state where an imaging distance of the optical system is 1400 mm.

In each figure, a left side is an enlargement conjugate side (object side), and a right side is a reduction conjugate side. In each figure, a left side is an enlargement conjugate side (image side). The optical system according to each example is an imaging optical system that collects a light beam from an unillustrated object located on the enlargement conjugate side to form an object image on an image plane 11, 21, 31, or 41 on the reduction conjugate side. An imaging plane (light receiving surface) of an image sensor such as a CCD sensor and a CMOS sensor is disposed on the image plane. However, the optical system according to each example can be a projection optical system of a projector that projects a light beam from a spatial light modulation element such as a liquid crystal panel disposed on the reduction conjugate side, onto a projected surface such as a screen disposed on the enlargement conjugate side. In the following description, the optical system is used as an imaging optical system of an in-vehicle camera.

The optical system according to each example includes, in order from the enlargement conjugate side to the reduction conjugate side, a front unit including a plurality of lenses, a diaphragm (aperture stop) ST1, ST2, ST3 or ST4, and a rear unit including a plurality of lenses. Each of a first lens L1, L21, L31 or L41 closest to the enlargement conjugate position and a second lens L2, L22, L32 or L42 second closest to the enlargement conjugate position in the front unit includes at least one aspherical surface. A final lens L8, L28, L37, or L48 closest to the reduction conjugate position in the rear unit (optical system) also has at least one aspherical surface. The aspherical surfaces of the first and the second lenses are formed in an aspherical shape having inflection points, respectively. The inflection point is a point (a circle centered on the optical axis) at which a sign of the curvature of the aspherical surface is switched.

The thus configured optical system according to each example has a projection characteristic compatible with both the fisheye lens and the telephoto lens as a single optical system, a sufficient angle of view, sufficient center and peripheral resolutions, and a good optical performance over the entire angle of view.

In the following description, the unit length per 1 deg of the angle of view is defined as the resolution (mm/deg), and a relationship between an image height y and an angle of view $\theta$ is defined as a projection characteristic $y(\theta)$. For example, a general f$\theta$ lens has a constant resolution at each image height and possesses a proportional projection characteristic. An angle formed by the optical axis and the outermost principal ray is defined as a maximum half angle of view.

In the optical system according to each example, in the in-vehicle camera, a first area as a central area near the optical axis (located on the optical axis side) is used for an E mirror instead of the rearview mirror, and a second area as a peripheral area on an off-axis side (located on the periphery side) of the first area is used for the rearview. The imaging magnification is different between the first area and the second area. A high resolution is available in the first area by the telephoto function, and a sufficient angle of view and a sufficient resolution in the peripheral area are available in the second area by the fisheye function.

Figure 9:
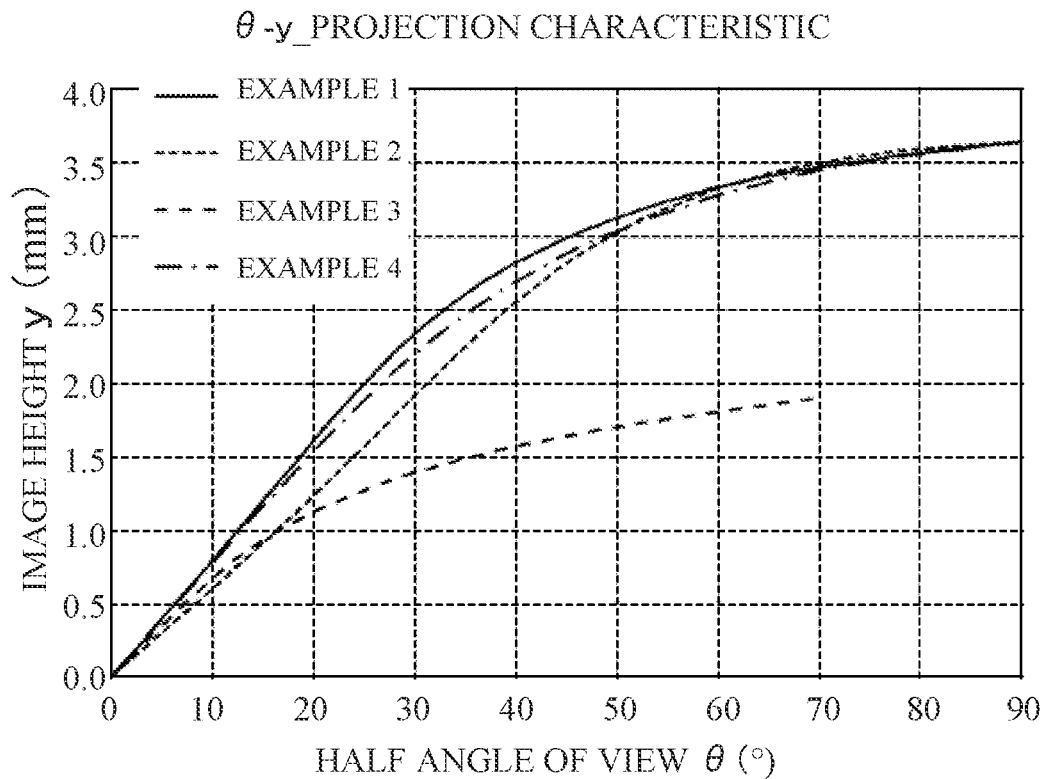
FIG. 9 illustrates projection characteristics of the optical systems according to Examples 1 to 4.
Figure 10:
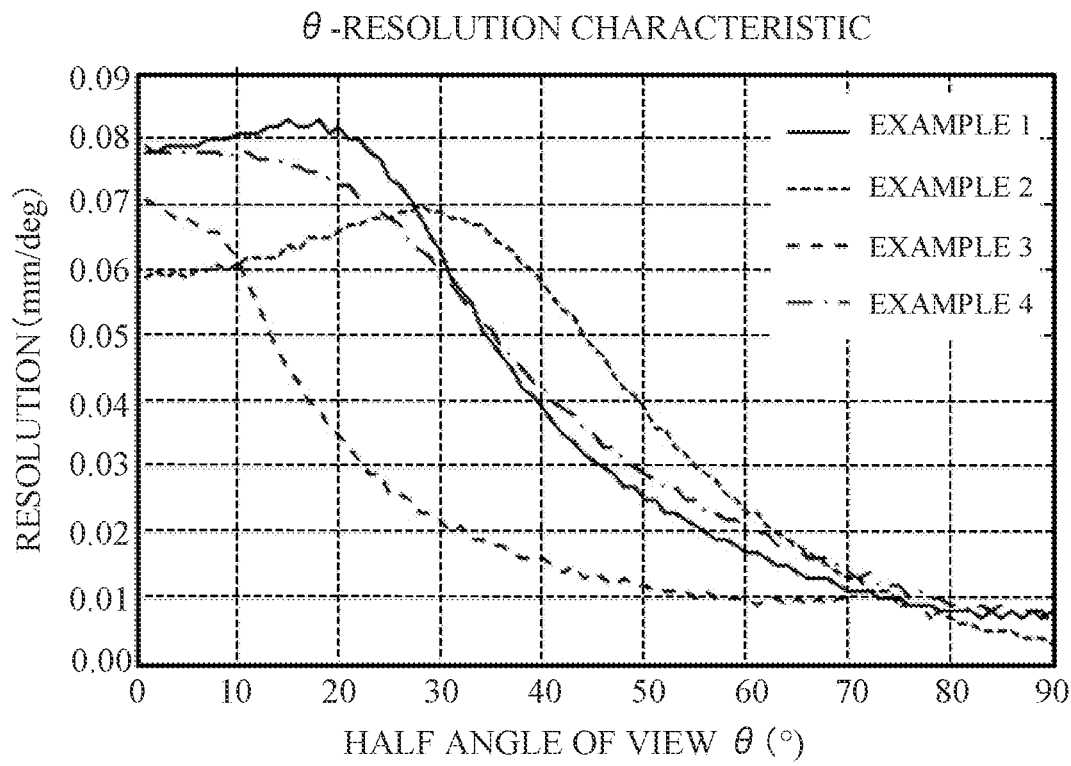
FIG. 10 illustrates resolution characteristics of the optical systems according to Examples 1 to 4.

FIG. 9 illustrates a projection characteristic $y(\theta)$ of each of the optical systems according to Examples 1 to 4 (as "$\theta$-y_PROJECTION CHARACTERISTIC") with different line types. FIG. 10 illustrates a resolution characteristic of each of the optical systems according to Examples 1 to 4 (as "$\theta$-RESOLUTION CHARACTERISTIC") with different line types. In each of the optical systems according to the examples, the imaging magnification is different between the first area and the second area, the resolution is high within the angle of view corresponding to the first area, and the resolution within the angle of view corresponding to the second area decreases as the angle of view increases.

The optical system according to each example has a distortion and a curvature of field enough to realize such a projection characteristic. More specifically, by providing an aspherical surface as described above to the first lens, the second lens, and the final lens, each of which receives an incident off-axis ray at a high position, the distortion and the curvature of field are effectively given. The aspherical surface of the lens on the enlargement conjugate side mainly controls the projection characteristic, and the aspherical surfaces of the subsequent lenses correct the curvature of field. Each of the first and second lenses L1 and L2 has a meniscus shape. The meniscus structure can suppress the aberration over wide angles of view, and can secure good image quality.

Figure 11A:
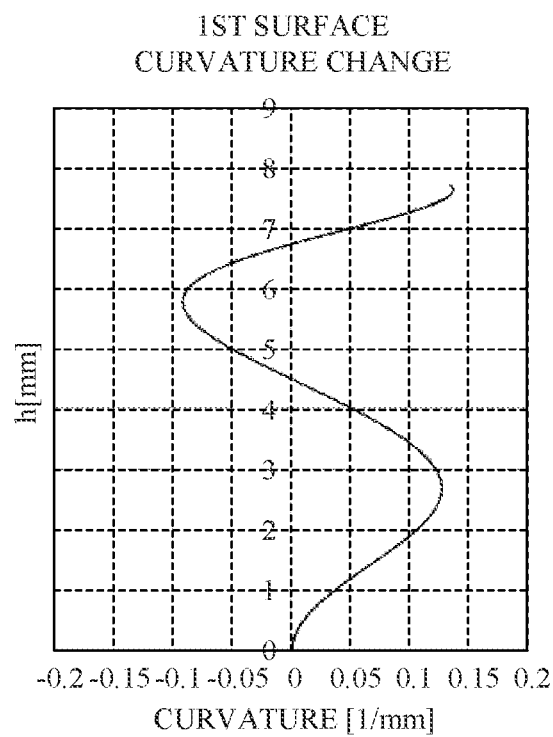
FIGS. 11A to 11F illustrate a curvature characteristic of the optical system according to Example 1.
Figure 11B:
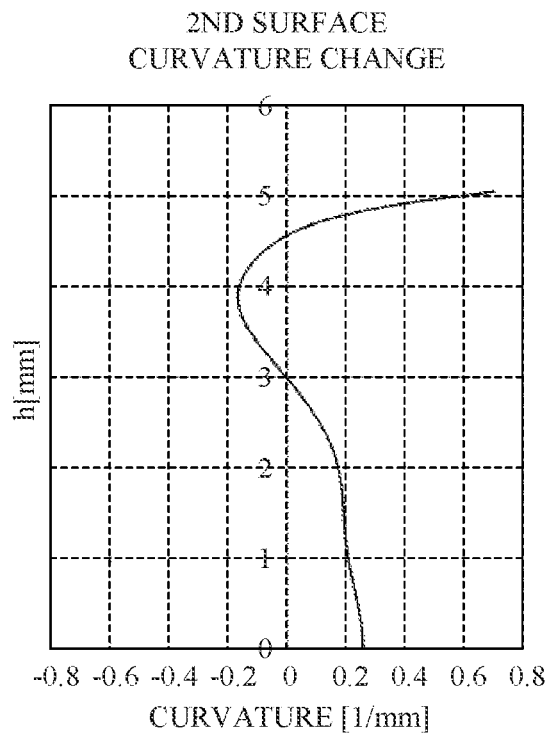
Figure 11C:
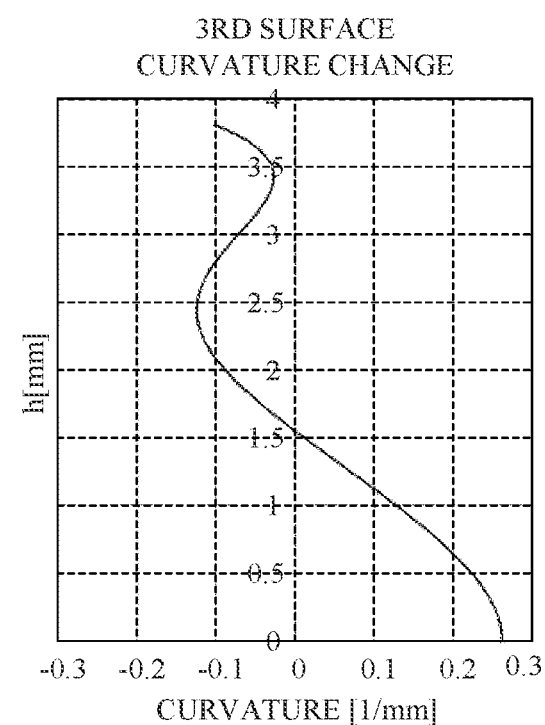
Figure 11D:
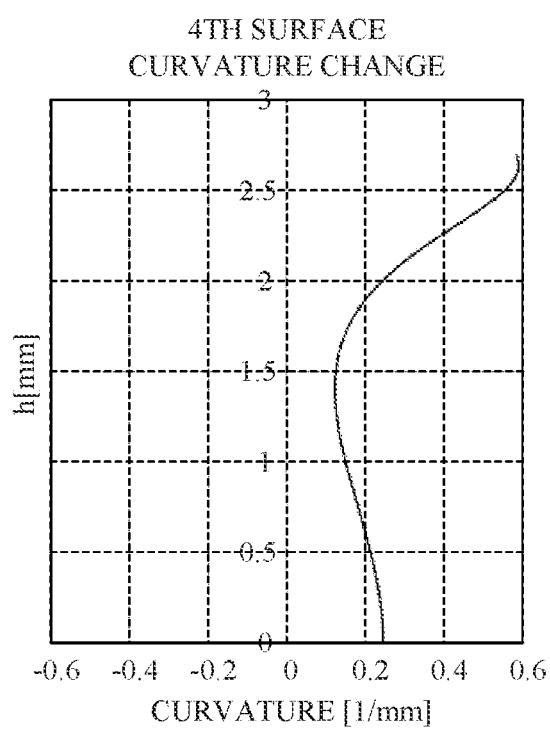
Figure 11E:
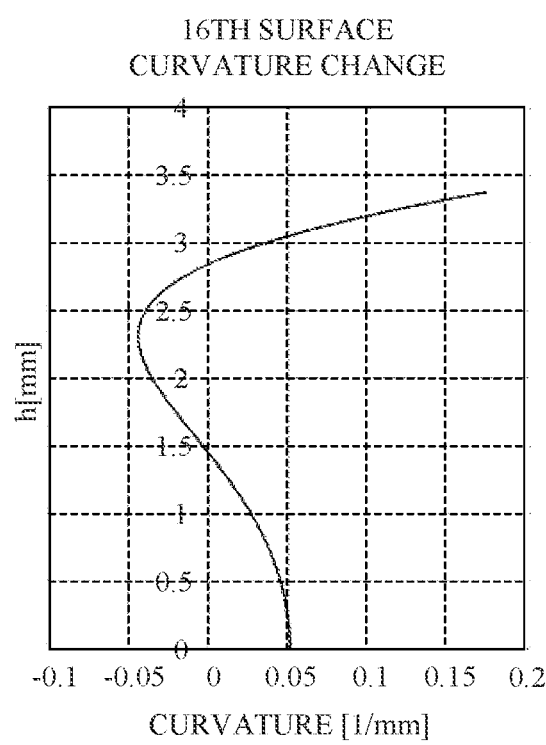
Figure 11F:
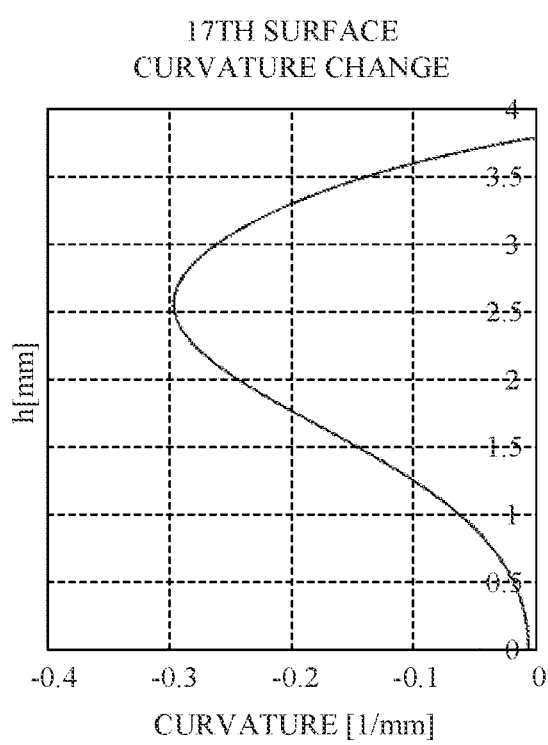
Figure 12A:
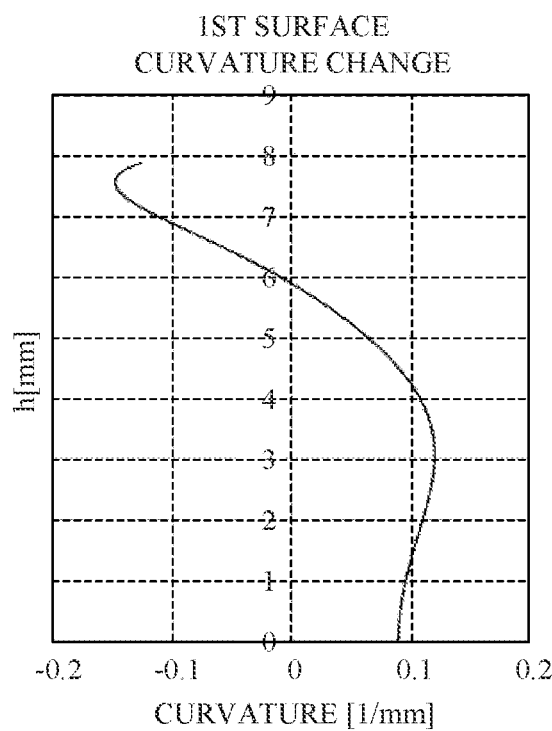
FIGS. 12A to 12F illustrate a curvature characteristic of the optical system according to Example 2.
Figure 12B:
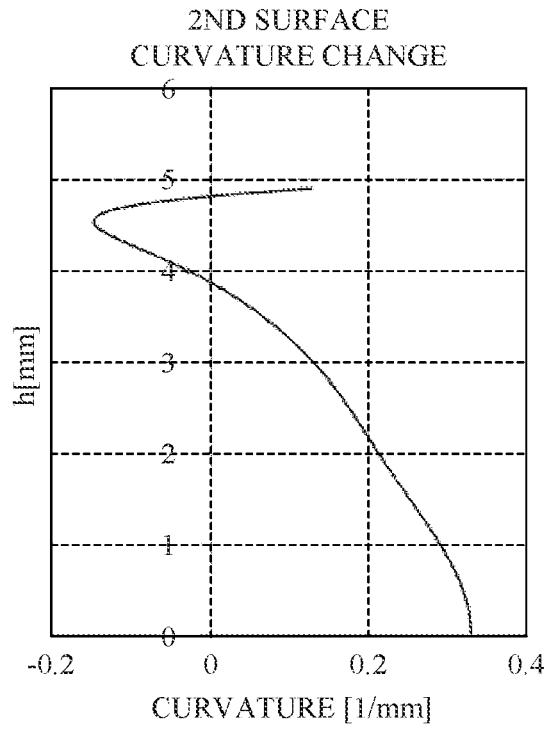
Figure 12C:
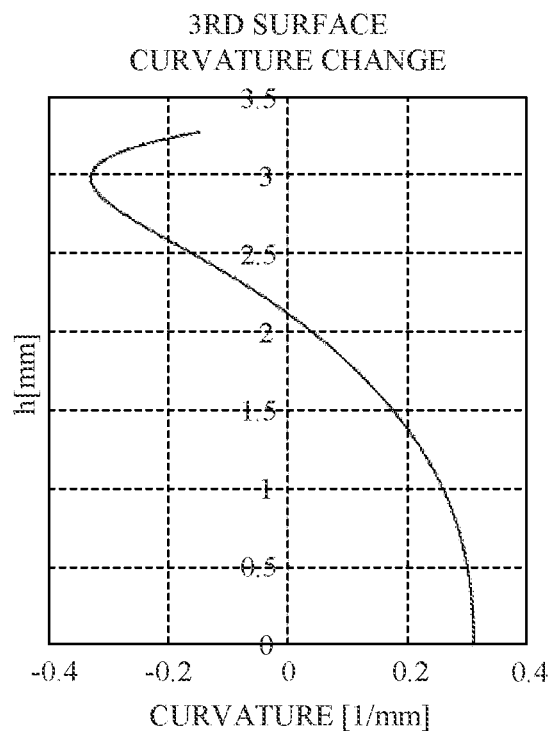
Figure 12D:
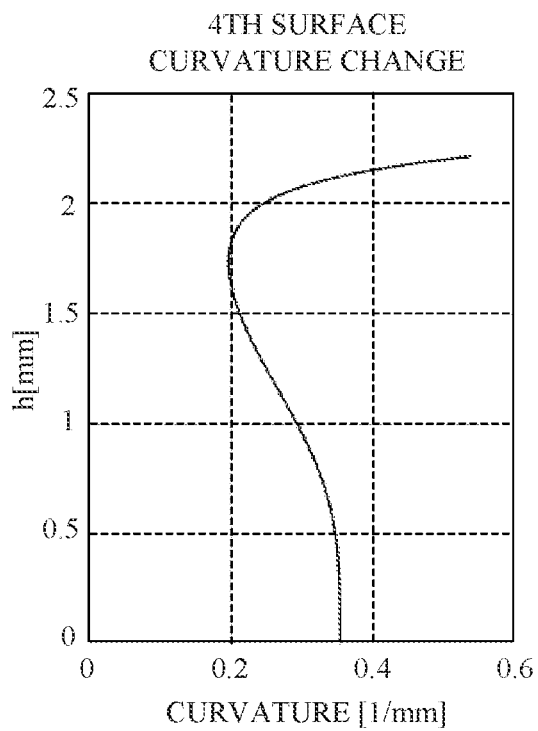
Figure 12E:
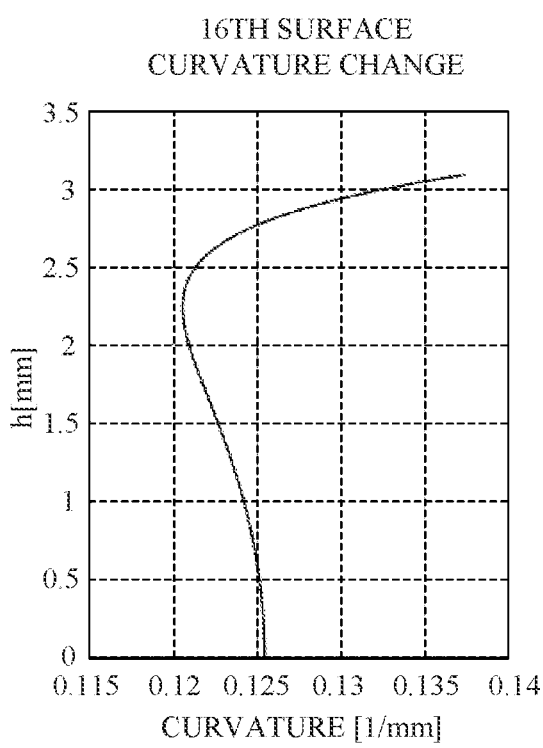
Figure 12F:
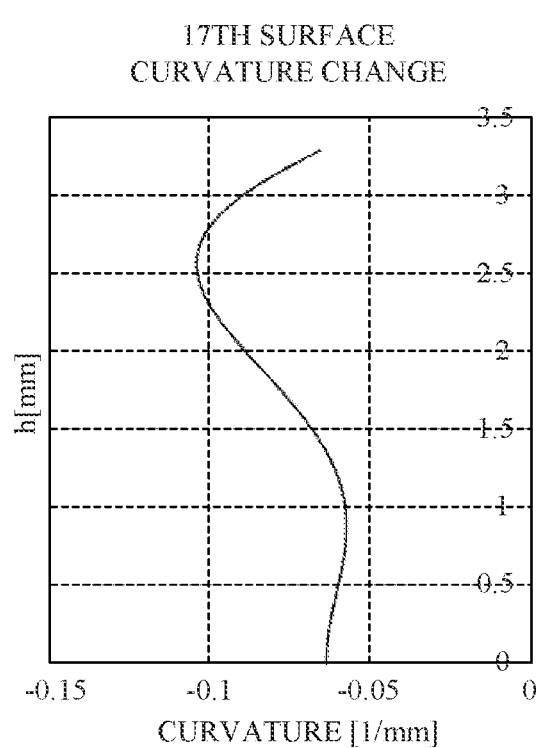
Figure 13A:
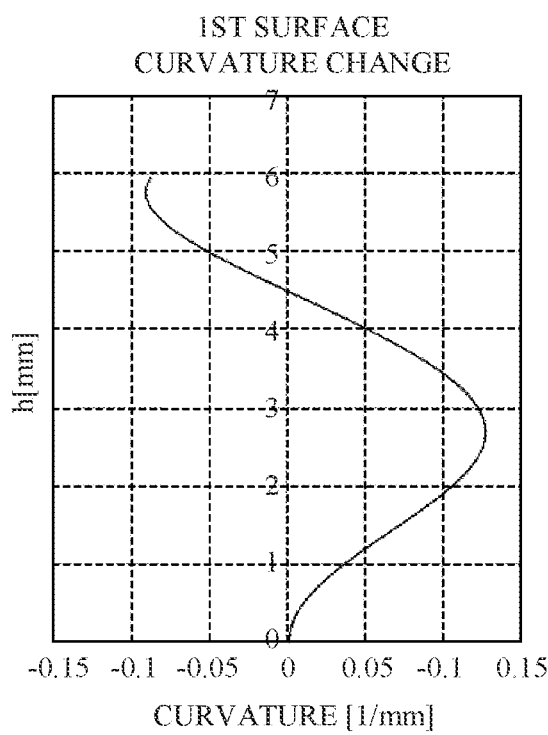
FIGS. 13A to 13D illustrate a curvature characteristic of the optical system according to Example 3.
Figure 13B:
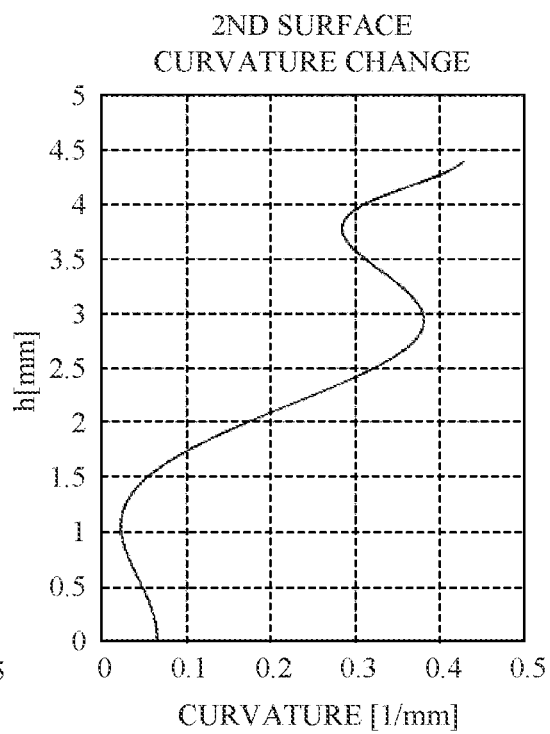
Figure 13C:
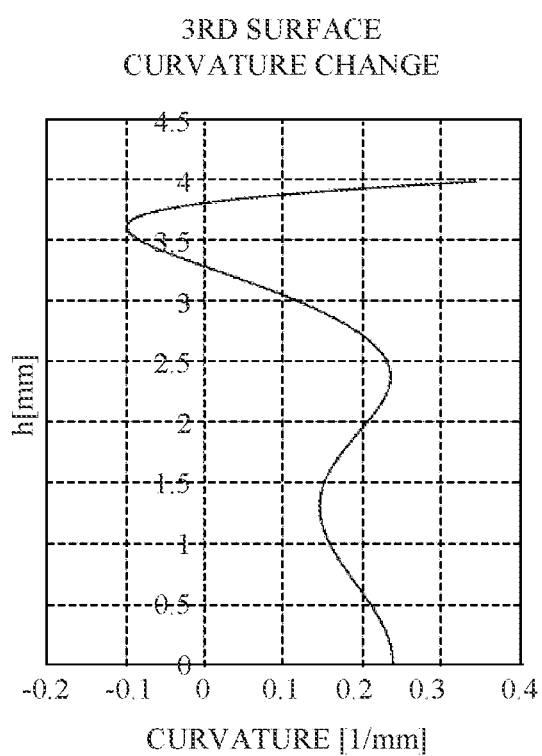
Figure 13D:
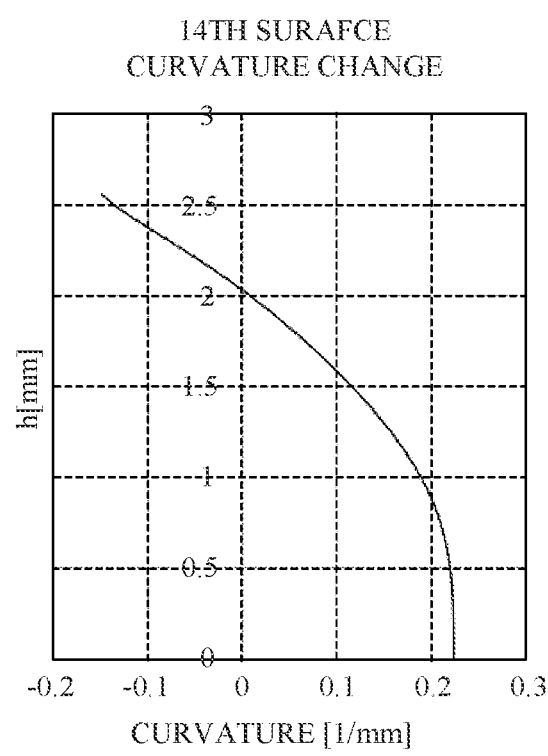
Figure 14A:
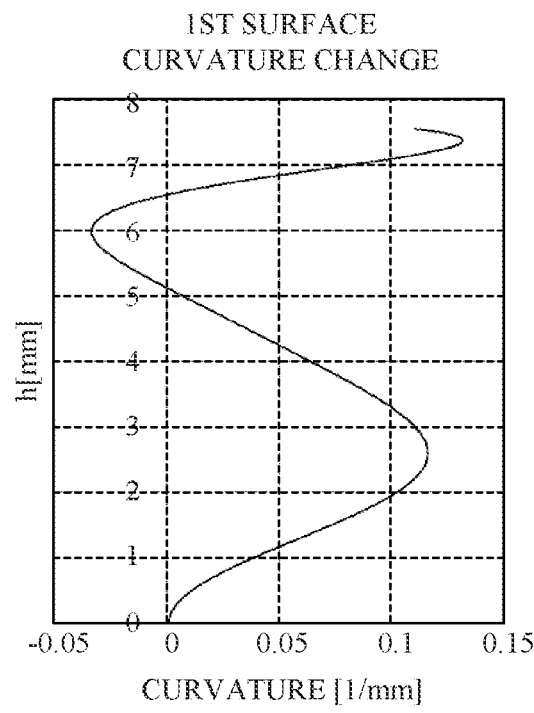
FIGS. 14A to 14F illustrate a curvature characteristic of the optical system according to Example 4.
Figure 14B:
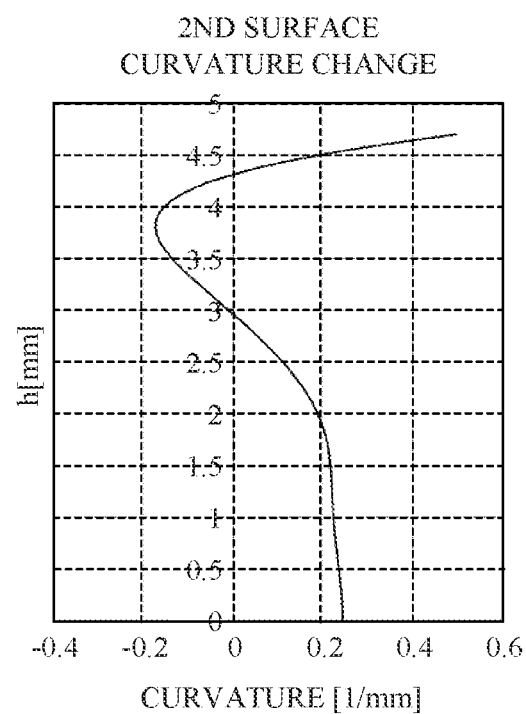
Figure 14C:
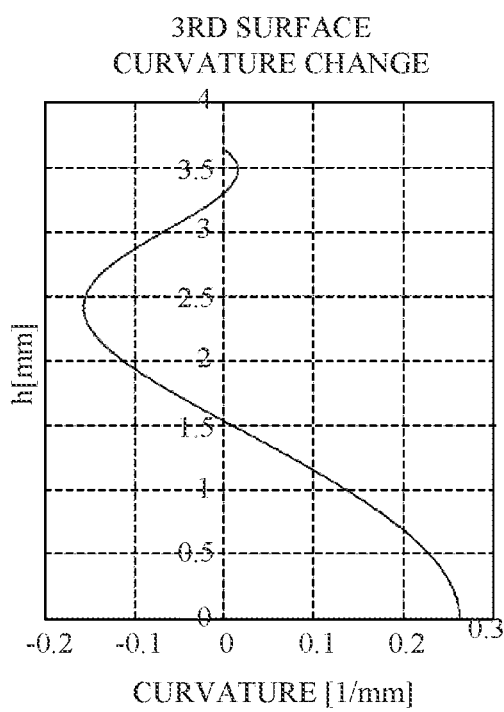
Figure 14D:
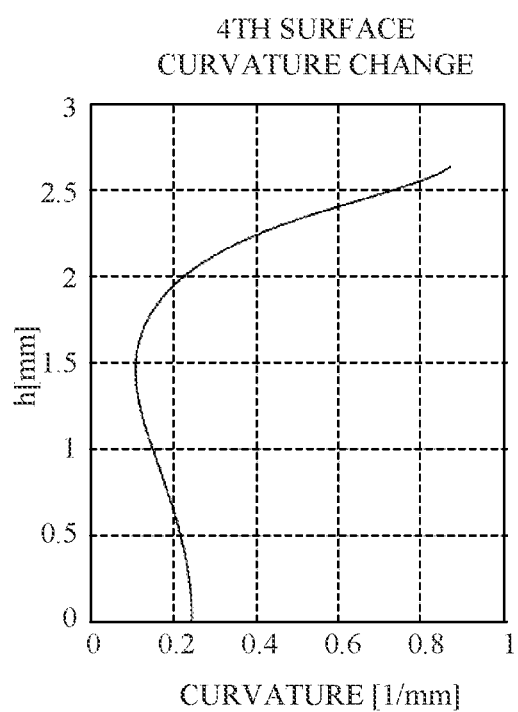
Figure 14E:
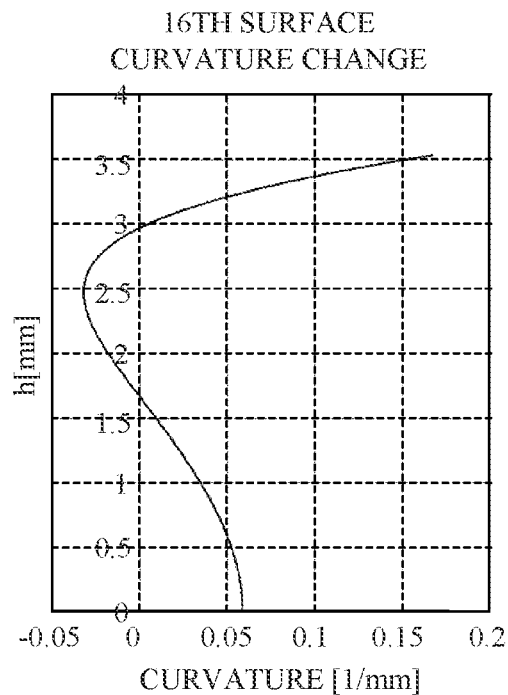
Figure 14F:
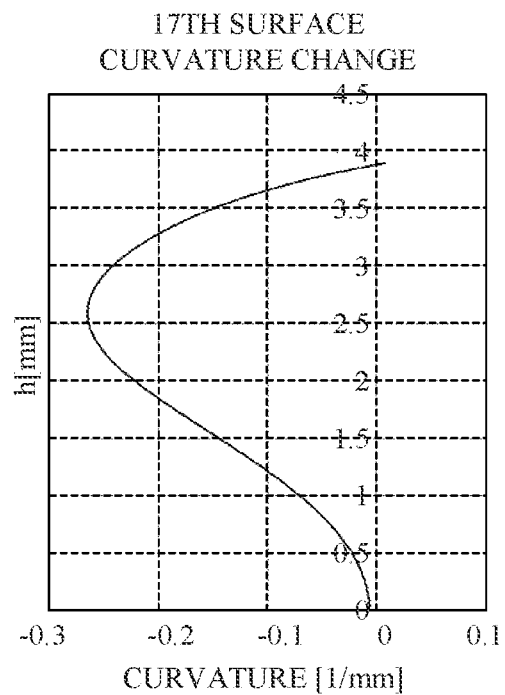

FIGS. 11A to 11F illustrate a curvature characteristic (y-C characteristic) showing a relationship between the radial height y (vertical axis) and the curvature C (horizontal axis) from the optical axis of the aspherical surface of the optical system according to Example 1. FIG. 11A illustrates a y-C characteristic of a first surface on the enlargement conjugate side of the first lens L1. FIG. 11B illustrates a y-C characteristic of a second surface on the reduction conjugate side of the first lens L1. FIG. 11C illustrates a y-C characteristic of a third surface on the enlargement conjugate side of the second lens L2. FIG. 11D illustrates a y-C characteristic of a fourth surface on the reduction conjugate side of the second lens L2. FIG. 11E illustrates a y-C characteristic of a sixteenth surface on the enlargement conjugate side of the eight lens (final lens) L8. FIG. 11F illustrates a y-C characteristic of a seventeenth surface on the reduction conjugate side of the eighth lens L8.

As understood from these figures, in the optical system according to Example 1, the aspherical surfaces (first, second, and third surfaces) on the enlargement conjugate side of the diaphragm ST have inflection points. In particular, by providing inflection points to the first surface and the second surface of the first lens L1, the above projection characteristic is realized by significantly changing the resolution in the first area and the second area. In order to realize the above projection characteristic, the aspherical surface on the enlargement conjugate side has a shape having a plurality of inflection points in the same surface.

For example, in the first surface illustrated in FIG. 11A, as the image height y changes in a direction from the vicinity of the optical axis to the off-axis side (periphery side or the outside in the radial direction), the curvature C first changes from positive to negative around y=4.5 mm, and then changes to positive at the inflection point near 6.8 mm on the off-axis side. That is, the first surface has two inflection points. This aspherical shape is formed for the following reasons. First, near the optical axis, the aspherical shape is made to have a convex shape facing the enlargement conjugate side in order to provide the telephoto effect, and then the aspherical shape is changed to have a concave shape facing the enlargement conjugate side in order to gradually reduce the resolution toward the off-axis side. In order to secure the resolution near the periphery, the aspherical shape is again changed to have a convex shape facing the enlargement conjugate side.

In the optical system according to Example 1, the second surface of the first lens L1 is also has an aspheric surface whose shape changes to have, in order from the optical axis side to the off-axis side, a convex shape facing the enlargement conjugate side, a concave shape facing the enlargement conjugate side, and a convex shape facing the enlargement conjugate side, similar to the first surface. The third surface of the second lens L2 also has an aspherical surface whose shape changes to have, in order from the optical axis side to the off-axis side, a convex shape facing the enlargement conjugate side and a concave shape facing the enlargement conjugate side. Thereby, the above projection characteristic can be effectively realized. In particular, the above projection characteristic can be more effectively realized by providing aspherical surfaces to both sides of the first lens L1 that receives an incident off-axis ray at a high position and by providing inflection points to both sides.

The following inequality (conditional expression) may be satisfied;

$$0.3 \leq |yi/yL1| < 1.0 \quad (1)$$

where yi is a distance in the radial direction from the optical axis to the inflection point on the aspherical surface of the first lens in the optical system according to each example, and yL1 is an effective radius (effective light beam radius) of the first lens.

The inequality (1) defines a condition to form a good object image while realizing the above projection characteristic. When |y/yL1| shifts from the range of the inequality (1), the inflection point is provided by significantly changing the curvature relative to the paraxial curvature at an image height that is too close to the optical axis, and the continuity of the surface shape cannot be secured. As a result, a local curvature of field occurs, a good object image cannot be formed, and the image quality of the captured image is deteriorated.

The numerical range of the inequality (1) may be set as follows:

$$0.4 \leq |yi/yL1| \leq 0.9 \quad (1)'$$

The numerical range of the inequality (1) may be set as follows:

$$0.5 \leq |yi/yL1| \leq 0.8 \quad (1)''$$

The optical system according to each example has a retrofocus configuration in which the first lens has a negative focal length f1 and the second lens has a positive focal length f2 in order to obtain a sufficient angle of view. The focal lengths (paraxial focal lengths) f1 and f2 of the first and second lenses may satisfy the following inequality (2).

$$0.1 \leq |f2/f1| \leq 6.0 \quad (2)$$

If f2/f1 is lower than the lower limit in the inequality (2), the negative refractive power becomes relatively weak and it becomes difficult to increase the angle of view of the optical system. If f2/f1 is higher than the upper limit in the inequality (2), the negative refractive power becomes relatively strong, the curvature of field becomes in the overcorrection state, and it becomes difficult to obtain a good object image.

The numerical range of the inequality (2) may be set as follows:

$$0.3 \leq |f2/f1| \leq 5.0 \quad (2)'$$

The numerical range of the inequality (2) may be set as follows:

$$0.5 \leq |f2/f1| \leq 4.5 \quad (2)''$$

In the optical system according to each example, by providing an inflection point to the aspherical surface of the final lens that receives an off-axis principal ray at a high incident position, the curvature of field can be more effectively corrected.

Since the configuration of the optical system according to each example is more effective as the angle of view becomes wider, the maximum half angle of view θ max may satisfy the following inequality (3):

$$\theta\ max \geq 70° \quad (3)$$

The numerical range of the inequality (3) may be set as follows:

$$\theta\ max \geq 90° \quad (3)'$$

A detailed description will now be given of the projection characteristic of the optical system according to each example. The orthogonal projection is known as a projection characteristic in which the resolution near the optical axis is higher than the resolution in the periphery. In the orthogonal projection, f sin θ max/ymax=1 is satisfied where ymax is a maximum image height (edge of the image sensor), and θ max is a maximum half angle of view.

On the other hand, for example, the optical system according to Example 1 realizes a projection characteristic that satisfies f sin θ max/ymax=1.23 in which a difference in resolution between the center and the periphery is large while forming a better object image.

f sin θ max/ymax may satisfy the following inequality (4):

$$0.6 \leq f \sin\theta\ max/y\ max \leq 2.4 \quad (4)$$

If f sin θ max/ymax is lower than the lower limit in the inequality (4), the sufficient projection characteristic cannot be realized as the projection characteristic of each of the above examples, and the vicinity of the center cannot be sufficiently enlarged. If f sin θ max/ymax is higher than the upper limit in the inequality (4), the correction of curvature of field becomes insufficient and it becomes difficult to form a good object image.

The numerical range of the inequality (4) may be set as follows:

$$0.7 \leq f \sin\theta\ max/y\ max \leq 2.2 \quad (4)'$$

The numerical range of the inequality (4) may be set as follows:

$$0.8 \leq f \sin\theta\ max/y\ max \leq 2.1 \quad (4)''$$

In order to obtain a good object image while realizing the above projection characteristic and wide angle of view, the following lens configuration (refractive power arrangement) may be used. That is, the front unit includes, in order from the enlargement conjugate side to the reduction conjugate side, a first lens having a negative refractive power, a second lens having a positive refractive power, a third lens having a negative refractive power, and a fourth lens having a positive refractive power. The rear unit includes, in order from the enlargement conjugate side to the reduction conjugate side, a fifth lens having a negative or positive refractive power, a sixth lens having a positive refractive power, a seventh lens having a negative refractive power, and an eighth lens having a positive refractive power.

The rear unit may include, in order from the enlargement conjugate side to the reduction conjugate side, a fifth lens having a positive refractive power, a sixth lens having a negative refractive power, and a seventh lens having a positive refractive power.

The above description is a minimum necessary configuration for an example of the present invention, and the configuration of the example is not limited to this description. For example, the position of the diaphragm may be a position near a position where the off-axis principal ray intersects the optical axis, and is not limited to the position of the physical diaphragm. The projection characteristic, the position and number of inflection points, and the like are not limited to the above examples.

Optical systems according to Examples 1 to 4 will be specifically described.

Example 1

The optical system according to Example 1 illustrated in FIG. 1 includes, in order from the enlargement conjugate side to the reduction conjugate side, a front unit that includes a first lens L1 having a negative refractive power, a second lens L2 having a positive refractive power, a third lens L3 having a negative refractive power, and a fourth lens L4 having a positive refractive power; a diaphragm STL; and a rear unit that includes a fifth lens L5 having a negative refractive power, a sixth lens L6 having a positive refractive power, a seventh lens L7 having a negative refractive power, and an eighth lens L8 having a positive refractive power. In FIG. 1, P1 and P2 are glass plates such as filters.

Table 1 illustrates specific numerical examples of this example. In Table 1(A), ri denotes a radius of curvature (mm) of an i-th surface counted from the object side, di denotes a lens thickness or air spacing (mm) between an i-th surface and an (i+1)-th surface, and ni denotes a refractive index for the d-line of an optical material between an i-th surface and an (i+1)-th surface. vi denotes an Abbe number based on the d-line of the optical material between an i-th surface and an (i+1)-th surface.

The Abbe number v is expressed as follows:

$$v=(Nd-1)/(NF-NC)$$

where Nd, NF, and NC are refractive indexes for the d-line (587.6 nm), the F-line (486.1 nm), and the C-line (656.3 nm) in the Fraunhofer lines.

ST denotes a position of the diaphragm. An asterisk * attached to the surface number means that the surface is an aspherical surface. The aspheric shape is expressed by the following expression:

$$z(y=(y^2/Ri)/[1+\{1-(1+k)(y^2/Ri^2)\}^{1/2}]+Ay^4+By^6+Cy^8+Dy^{10}+Ey^{12}+Fy^4+Gy^{16}$$

where y is a coordinate in the radial direction, z is a coordinate in the optical axis direction, K is a conical constant, a light traveling direction is set positive, and R is a paraxial radius of curvature, and A, B, C, D, E, F, and G are aspherical coefficients. Table 1(B) shows a conical constant and an aspherical coefficient.

Table 1(C) summarizes values corresponding to the inequalities (1) to (4) in the numerical example. Values of yi, yLi, f1, f2, and ymax are also shown as reference values. The above description of the numerical examples is similarly applied to the numerical examples of the other examples.

As illustrated in Table 1(C), the optical system according to this example (numerical example 1) satisfies the inequalities (1) to (4).

As described above, FIG. 9 illustrates the projection characteristic of the optical system of this example (numerical example 1), and FIGS. 11A to 11F illustrate curvature characteristics of the aspherical surfaces (first surface, second surface, third surface, fourth surface, sixteenth surface, and seventeenth surface) in the optical system according to this example.

Figure 2:
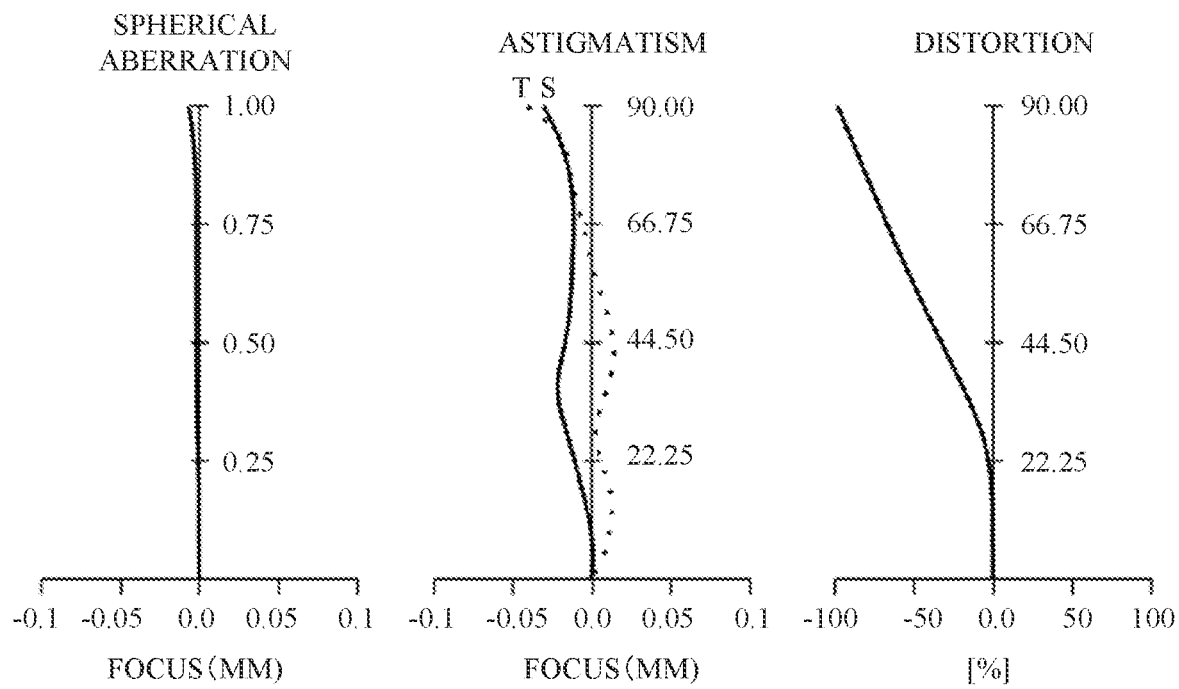
FIG. 2 is an aberration diagram of the optical system according to Example 1.

FIG. 2 illustrates a longitudinal aberration diagram of this example (numerical example 1) at an imaging distance of 1400 mm. In the spherical aberration diagram, a solid line denotes the spherical aberration for the d-line (wavelength 587.6 nm). In the astigmatism diagram, a solid line S denotes a sagittal image plane, and a broken line T denotes a meridional image plane. The distortion diagram is illustrated for the d-line. The description of these longitudinal aberration diagrams is similarly applied to those of the other examples.

Example 2

Figure 3:
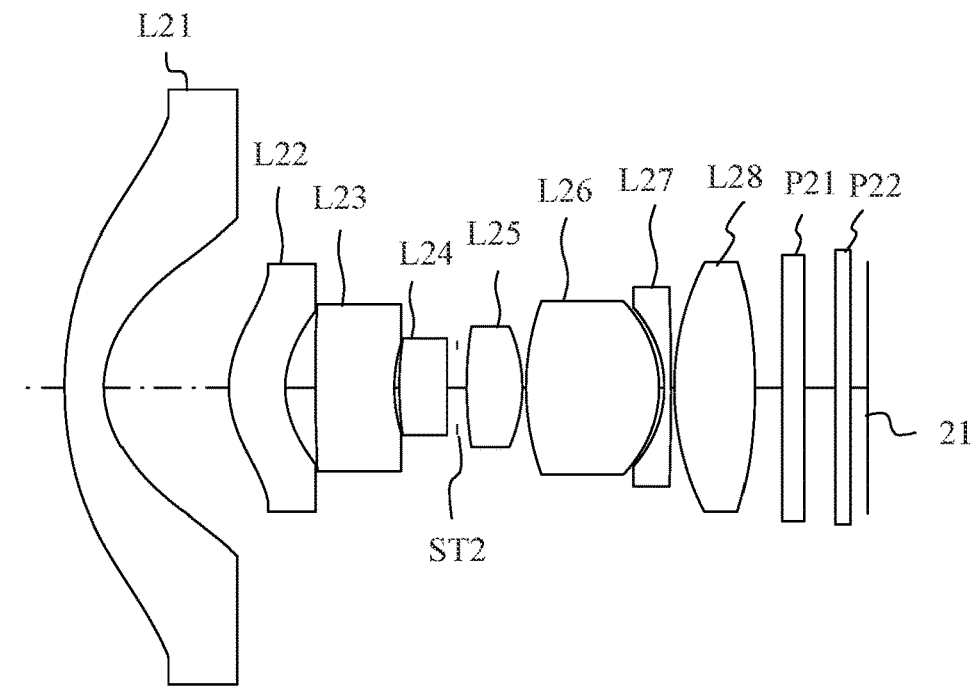
FIG. 3 is a sectional view of an optical system according to Example 2.

The optical system according to Example 2 illustrated in FIG. 3 is different from that of Example 1 in the projection characteristic and the refractive power arrangement. The optical system according to this example includes, in order from the enlargement conjugate side to the reduction conjugate side, a front unit that includes a first lens L21 having a negative refractive power, a second lens L22 having a positive refractive power, a third lens L23 having a negative refractive power, and a fourth lens L24 having a positive refractive power; a diaphragm ST2; and a rear unit that includes a fifth lens L25 having a positive refractive power, a sixth lens L26 having a positive refractive power, a seventh lens L27 having a negative refractive power, and an eighth lens L28 having a positive refractive power. In FIG. 3, P21 and P22 are glass plates such as filters.

Table 2 illustrates specific numerical examples of this example. As illustrated in Table 2(C), the optical system according to this example (numerical example 2) satisfies the inequalities (1) to (4).

FIGS. 12A to 12F illustrate the curvature characteristics of the aspherical surfaces (first surface, second surface, third surface, fourth surface, sixteenth surface, and seventeenth surface) in the optical system according to this example (numerical example 2). The first and third surfaces have inflection points, and the second surface has two inflection points.

Figure 4:
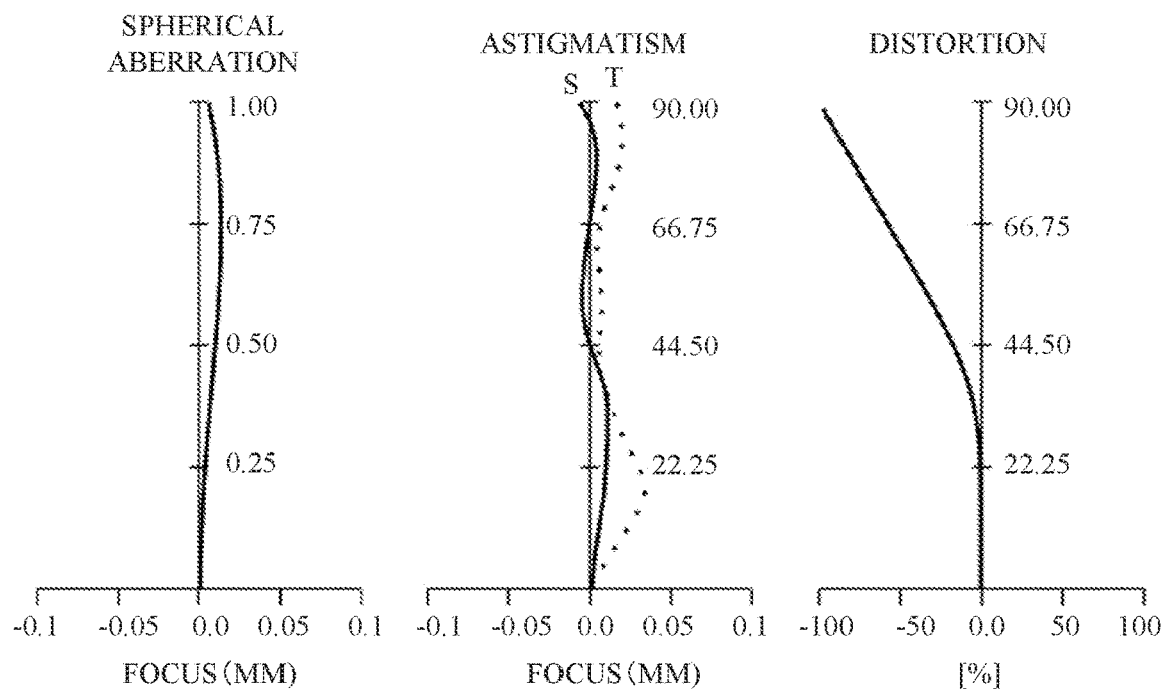
FIG. 4 is an aberration diagram of the optical system according to Example 2.

FIG. 4 illustrates a longitudinal aberration diagram of this example (numerical example 2) at an imaging distance of 1400 mm.

Example 3

Figure 5:
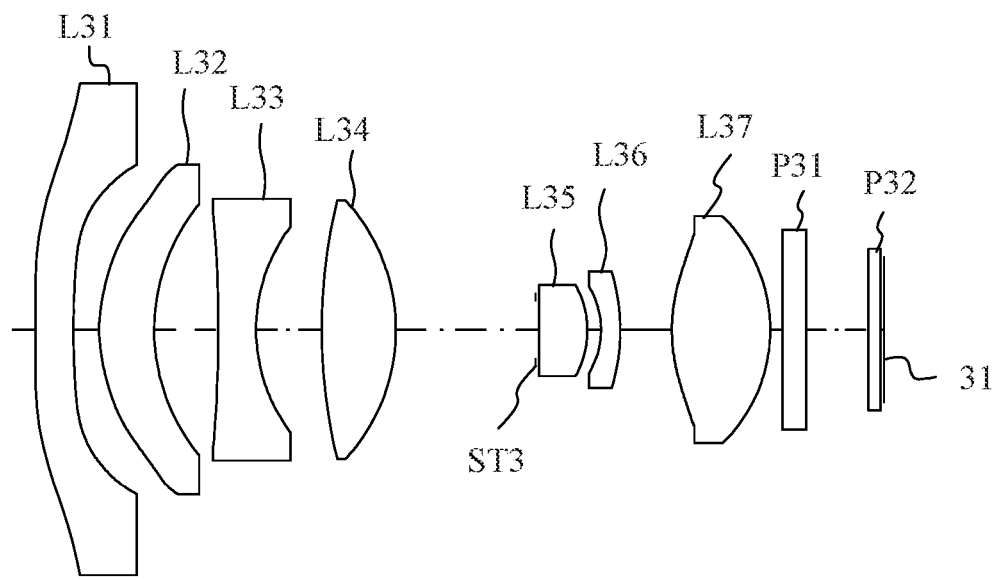
FIG. 5 is a sectional view of an optical system according to Example 3.

The optical system according to Example 3 illustrated in FIG. 5 is different from that of Example 1 in the number of lenses, the projection characteristic, and the angle of view (maximum half angle of view 70°). The optical system according to this example includes, in order from the enlargement conjugate side to the reduction conjugate side, a front unit that includes a first lens L31 having a negative refractive power, a second lens L32 having a positive refractive power, a third lens L33 having a negative refractive power, and a fourth lens L34 having a positive refractive power; a diaphragm ST3; and a rear unit that includes a fifth lens L35 having a positive refractive power, a sixth lens L36 having a negative refractive power, and a seventh lens L37 (final lens) having a positive refractive power. In FIG. 5, P31 and P32 are glass plates such as filters.

Table 3 illustrates specific numerical examples of this example. As illustrated in Table 3(C), the optical system according to this example (numerical example 3) satisfies the inequalities (1) to (4).

FIGS. 13A to 13D illustrates the curvature characteristics of the aspherical surfaces (first surface, second surface, third surface, and fourteenth surface) in the optical system according to this example (numerical example 3). The first and fourteenth surfaces have inflection points, and the third surface has two inflection points.

Figure 6:
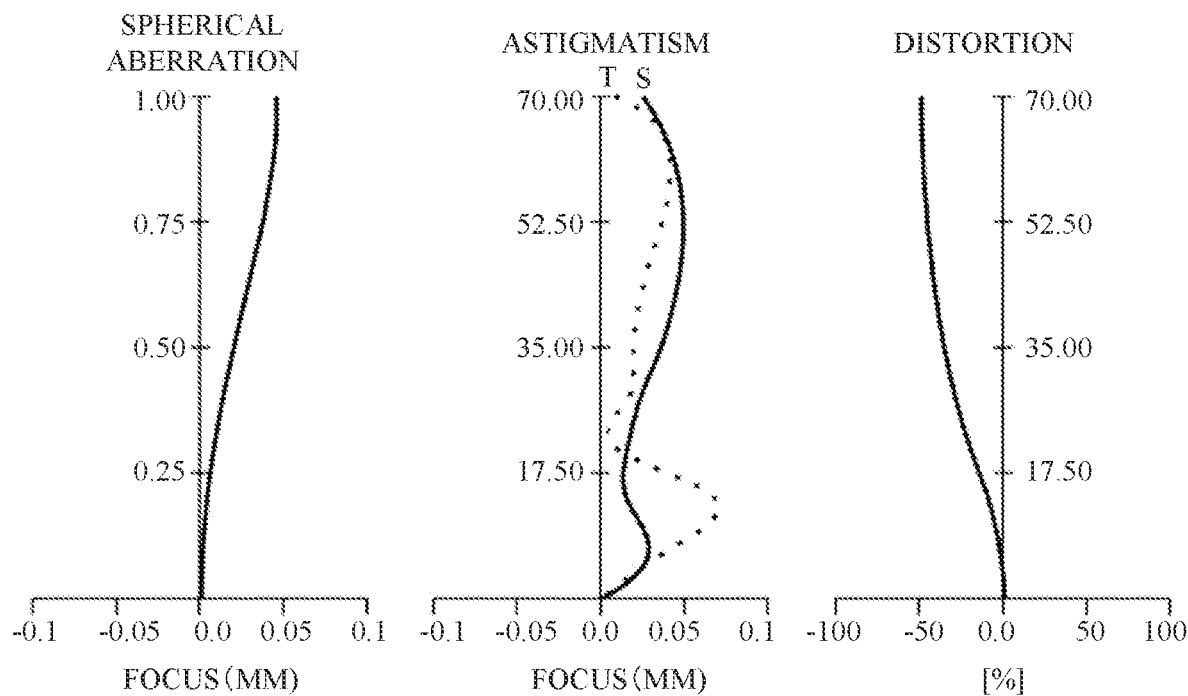
FIG. 6 is an aberration diagram of the optical system according to Example 3.

FIG. 6 illustrates a longitudinal aberration diagram of this example (numerical example 3) at an imaging distance of 1400 mm.

Example 4

Figure 7:
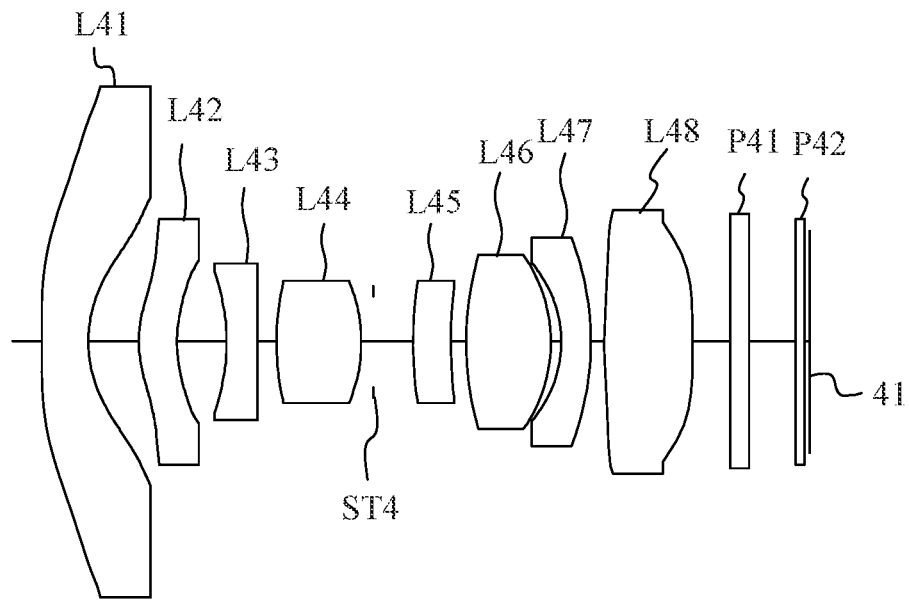
FIG. 7 is a sectional view of an optical system according to Example 4.

The optical system according to Example 4 illustrated in FIG. 7 is different from that of Example 1 in that the second lens counted from the enlargement conjugate side has an aspherical surface (third surface) having a plurality of inflection points. The optical system according to this example includes, in order from the enlargement conjugate side to the reduction conjugate side, a front unit that includes a first lens L41 having a negative refractive power, a second lens L42 having a positive refractive power, a third lens L43 having a negative refractive power, and a fourth lens L44 having a positive refractive power; a diaphragm ST4; and a rear unit that includes a fifth lens L45 having a negative refractive power, a sixth lens L46 having a positive refractive power, a seventh lens L47 having a negative refractive power, and an eighth lens L48 having a positive refractive power. In FIG. 7, P41 and P42 are glass plates such as filters.

Table 4 illustrates specific numerical examples according to this example. As illustrated in Table 4(C), the optical system according to this example (numerical example 4) satisfies the inequalities (1) to (4).

FIGS. 14A to 14F illustrate the curvature characteristics of the aspherical surfaces (first surface, second surface, third surface, fourth surface, sixteenth surface, and seventeenth surface) in the optical system according to this example (numerical example 4). The first, second, third, and sixteenth surfaces have two inflection points.

Figure 8:
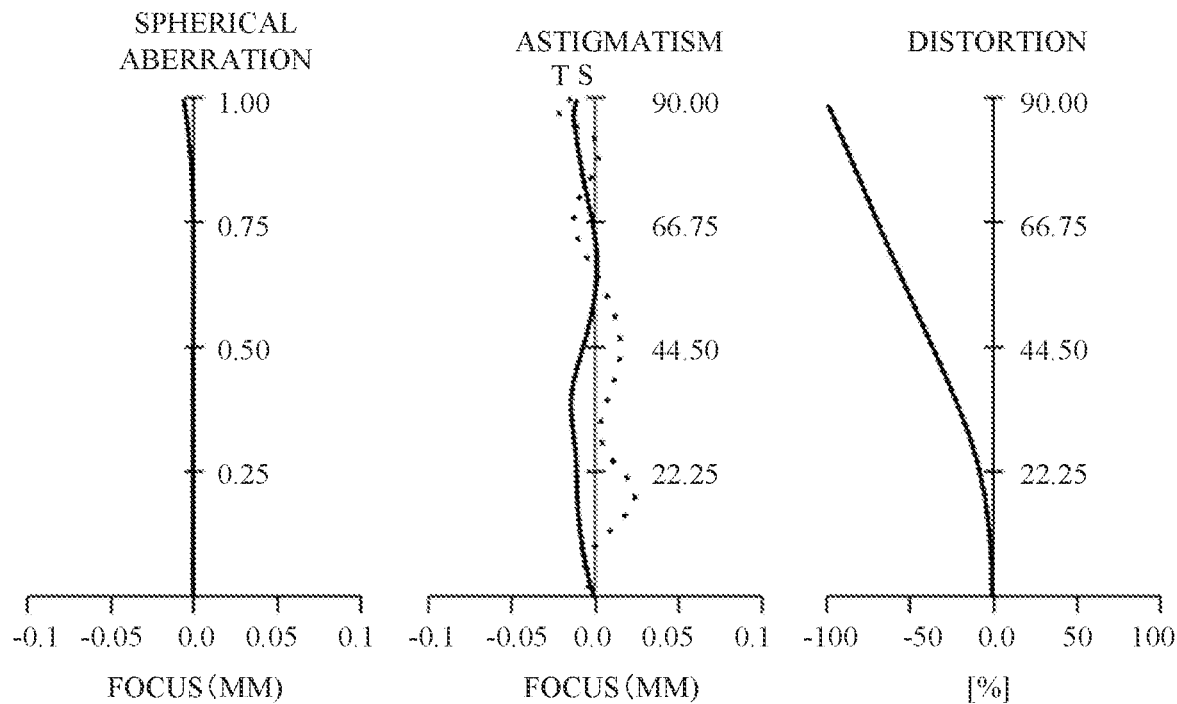
FIG. 8 is an aberration diagram of the optical system according to Example 4.

FIG. 8 illustrates a longitudinal aberration diagram of this example (numerical example 4) at an imaging distance of 1400 mm.

TABLE 1

(NUMERICAL EXAMPLE 1)

(A) LENS CONFIGURATION (UNIT: mm)

| | | | |
|---|---|---|---|
| f (FOCAL LENGTH) | | 4.50 | |
| F (APERTURE RATIO) | | 2.80 | |
| MAXIMUM HALF ANGLE OF VIEW | | 90.0° | |
| MAXIMUM IMAGE HEIGHT | | 3.65 | |

| | | | | |
|---|---|---|---|---|
| * | r1 = 673.22 | d1 = 1.50 | n1 = 1.639 | v1 = 55.2 |
| * | r2 = 3.89 | d2 = 1.91 | | |
| * | r3 = 3.80 | d3 = 1.50 | n2 = 1.851 | v2 = 40.1 |
| * | r4 = 4.10 | d4 = 1.52 | | |
| | r5 = −9.06 | d5 = 1.00 | n3 = 1.516 | v3 = 64.1 |
| | r6 = −245.04 | d6 = 0.57 | | |
| | r7 = 8.22 | d7 = 2.72 | n4 = 1.517 | v4 = 52.4 |
| | r8 = −5.73 | d8 = 0.66 | | |
| ST | r9 = ∞ | d9 = 1.08 | | |
| | r10 = −28.70 | d10 = 1.18 | n5 = 1.487 | v5 = 70.2 |
| | r11 = −123.86 | d11 = 0.40 | | |
| | r12 = 9.67 | d12 = 2.73 | n6 = 1.691 | v6 = 54.8 |
| | r13 = −4.67 | d13 = 0.36 | | |
| | r14 = −3.62 | d14 = 1.00 | n7 = 1.946 | v7 = 18.0 |
| | r15 = −8.09 | d15 = 0.20 | | |
| * | r16 = 19.77 | d16 = 2.83 | n8 = 1.583 | v8 = 59.5 |
| * | r17 = −150.00 | d17 = 1.21 | | |
| | r18 = ∞ | d18 = 0.65 | n9 = 1.560 | v9 = 56.0 |
| | r19 = ∞ | d19 = 1.64 | | |
| | r20 = ∞ | d20 = 0.30 | n10 = 1.500 | v10 = 63.0 |
| | r21 = ∞ | d21 = 0.04 | | |

(B) ASPHERICAL COEFFICIENT

| | K | A | B | C | D | E | F | G |
|---|---|---|---|---|---|---|---|---|
| r1 | 0 | 3.33E−03 | −1.25E−04 | 2.08E−06 | −1.87E−08 | 1.12E−10 | −4.14E−13 | 0 |
| r2 | −2.122357 | −2.66E−03 | 1.11E−03 | −1.36E−04 | 7.23E−06 | −1.84E−07 | 1.85E−09 | 0 |
| r3 | −1.766571 | −9.36E−03 | 1.91E−04 | 2.77E−05 | −1.73E−06 | 2.78E−08 | 0 | 0 |
| r4 | −0.7392095 | −1.05E−02 | 1.31E−03 | −1.29E−04 | 3.21E−05 | −4.70E−06 | 4.46E−07 | −1.832E−08 |
| r16 | 0 | −1.93E−03 | −5.44E−05 | 9.61E−06 | −6.18E−08 | −4.26E−09 | 0 | 0 |
| r17 | 0 | −3.81E−03 | −4.82E−04 | 6.83E−05 | −4.20E−06 | 1.38E−07 | −1.73E−09 | 0 |

(C) VALUES OF INEQUALITIES

| | |
|---|---|
| (1) | 0.58 |
| (2) | 3.01 |
| (3) | 90 |
| (4) | 1.23 |

REFERENCE VALUE

| | |
|---|---|
| yi | 4.47 |
| yL1 | 7.71 |
| f1 | −6.13 |
| f2 | 18.46 |
| ymax | 3.65 |

TABLE 2

(NUMERICAL EXAMPLE 2)

(A) LENS CONFIGURATION (UNIT: mm)

| | | |
|---|---|---|
| f (FOCAL LENGTH) | 3.40 | |
| F (APERTURE RATIO) | 2.88 | |
| MAXIMUM HALF ANGLE OF VIEW | 90.0° | |
| MAXIMUM IMAGE HEIGHT | 3.65 | |

| | | | | |
|---|---|---|---|---|
| * | r1 = 11.13 | d1 = 1.16 | n1 = 1.639 | v1 = 55.2 |
| * | r2 = 3.04 | d2 = 3.56 | | |
| * | r3 = 3.20 | d3 = 1.65 | n2 = 1.851 | v2 = 40.1 |
| * | r4 = 2.81 | d4 = 0.90 | | |
| | r5 = 148.59 | d5 = 2.22 | n3 = 1.653 | v3 = 41.1 |
| | r6 = 4.06 | d6 = 0.16 | | |
| | r7 = 9.88 | d7 = 1.40 | n4 = 1.850 | v4 = 32.0 |
| | r8 = 35.72 | d8 = 0.30 | | |
| ST | r9 = ∞ | d9 = 0.22 | | |
| | r10 = 8.64 | d10 = 1.65 | n5 = 1.582 | v5 = 61.4 |
| | r11 = −4.11 | d11 = 0.10 | | |
| | r12 = 7.62 | d12 = 3.82 | n6 = 1.519 | v6 = 66.6 |
| | r13 = −3.65 | d13 = 0.14 | | |
| | r14 = −3.41 | d14 = 0.22 | n7 = 1.850 | v7 = 32.0 |
| | r15 = −83.40 | d15 = 0.10 | | |
| * | r16 = 7.97 | d16 = 2.29 | n8 = 1.583 | v8 = 59.5 |
| * | r17 = −15.70 | d17 = 0.80 | | |
| | r18 = ∞ | d18 = 0.65 | n9 = 1.516 | v9 = 64.1 |
| | r19 = ∞ | d19 = 0.87 | | |
| | r20 = ∞ | d20 = 0.44 | n10 = 1.516 | v10 = 64.1 |
| | r21 = ∞ | d21 = 0.50 | | |

(B) ASPHERICAL COEFFICIENT

| | K | A | B | C | D | E | F |
|---|---|---|---|---|---|---|---|
| r1 | 0 | 5.32E−04 | −5.05E−06 | −1.66E−07 | 1.50E−09 | 0 | 0 |
| r2 | −2.100389 | 5.68E−03 | −3.08E−04 | 2.78E−05 | −1.53E−06 | 2.69E−08 | 0 |
| r3 | −0.6799194 | −8.22E−04 | −6.13E−04 | −7.43E−06 | 1.67E−06 | 0 | 0 |
| r4 | 0.2269621 | −1.78E−03 | −3.59E−03 | 5.49E−04 | −5.37E−05 | 0 | 0 |
| r16 | −0.2068002 | −5.06E−05 | −1.61E−06 | 3.93E−08 | 1.38E−08 | 1.96E−09 | 0 |
| r17 | −95.567581 | −1.50E−03 | −4.30E−05 | 4.45E−06 | 9.55E−08 | −8.52E−09 | 4.04E−11 |

(C) VALUES OF INEQUALITIES

| | |
|---|---|
| (1) | 0.74 |
| (2) | 4.05 |
| (3) | 90 |
| (4) | 0.93 |

REFERENCE VALUE

| | |
|---|---|
| yi | 5.79 |
| yL1 | 7.83 |
| f1 | −6.95 |
| f2 | 28.14 |
| ymax | 3.65 |

TABLE 3

(NUMERICAL EXAMPLE 3)

(A) LENS CONFIGURATION (UNIT: mm)

| | | |
|---|---|---|
| f (FOCAL LENGTH) | 4.05 | |
| F (APERTURE RATIO) | 2.80 | |
| MAXIMUM HALF ANGLE OF VIEW | 70.0° | |
| MAXIMUM IMAGE HEIGHT | 1.90 | |

| | | | | |
|---|---|---|---|---|
| * | r1 = 670.00 | d1 = 1.00 | n1 = 1.639 | v1 = 55.2 |
| * | r2 = 15.16 | d2 = 0.71 | | |
| * | r3 = 4.18 | d3 = 1.46 | n2 = 1.851 | v2 = 40.1 |
| | r4 = 5.24 | d4 = 1.67 | | |
| | r5 = −40.74 | d5 = 1.00 | n3 = 1.883 | v3 = 40.8 |
| | r6 = 4.57 | d6 = 1.73 | | |

TABLE 3-continued (NUMERICAL EXAMPLE 3)

|    |    | r7 = 14.62   | d7 = 2.00  | n4 = 1.654 | v4 = 39.7 |
|----|----|--------------|------------|------------|-----------|
|    |    | r8 = −5.03   | d8 = 3.67  |            |           |
|    | ST | r9 = ∞       | d9 = 0.10  |            |           |
|    |    | r10 = 2223.65| d10 = 1.28 | n5 = 1.487 | v5 = 70.2 |
|    |    | r11 = −2.28  | d11 = 0.37 |            |           |
|    |    | r12 = −2.04  | d12 = 0.50 | n6 = 1.946 | v6 = 18.0 |
|    |    | r13 = −4.75  | d13 = 1.34 |            |           |
| *  |    | r14 = 4.46   | d14 = 2.63 | n7 = 1.583 | v7 = 59.5 |
|    |    | r15 = −4.13  | d15 = 0.30 |            |           |
|    |    | r16 = ∞      | d16 = 0.65 | n8 = 1.560 | v8 = 56.0 |
|    |    | r17 = ∞      | d17 = 1.64 |            |           |
|    |    | r18 = ∞      | d18 = 0.30 | n9 = 1.500 | v9 = 63.0 |
|    |    | r19 = ∞      | d19 = 0.10 |            |           |

(B) ASPHERICAL COEFFICIENT

|     | K          | A         | B         | C         | D         | E         | F          |
|-----|------------|-----------|-----------|-----------|-----------|-----------|------------|
| r1  | 0          | 3.33E−03  | −1.25E−04 | 2.08E−06  | −1.87E−08 | 1.12E−10  | −4.14E−13  |
| r2  | 9.92365612 | −7.55E−03 | 1.66E−03  | −1.30E−04 | 6.27E−06  | −1.99E−07 | 3.14E−09   |
| r3  | −4.3820869 | −3.68E−03 | 1.08E−03  | −4.38E−05 | −1.77E−06 | 9.82E−08  | 0          |
| r14 | 0          | −5.98E−04 | −1.39E−03 | 2.02E−04  | −1.90E−05 | 7.65E−07  | 0          |

(C) VALUES OF INEQUALITIES

| (1) | 0.75 |
| (2) | 0.61 |
| (3) | 70   |
| (4) | 2.00 |

REFERENCE VALUE

| yi   | 4.46   |
| yL1  | 5.94   |
| f1   | −24.31 |
| f2   | 14.86  |
| ymax | 1.90   |

TABLE 4

(NUMERICAL EXAMPLE 4)

(A) LENS CONFIGURATION (UNIT: mm)

| f (FOCAL LENGTH)         | 4.47  |
| F (APERTURE RATIO)       | 2.80  |
| MAXIMUM HALF ANGLE OF VIEW | 90.0° |
| MAXIMUM IMAGE HEIGHT     | 3.65  |

|    |    | r1 = 1350.32 | d1 = 1.50  | n1 = 1.639 | v1 = 55.2 |
| *  |    | r2 = 4.09    | d2 = 1.67  |            |           |
| *  |    | r3 = 3.80    | d3 = 1.22  | n2 = 1.851 | v2 = 40.1 |
| *  |    | r4 = 4.13    | d4 = 1.60  |            |           |
|    |    | r5 = −7.51   | d5 = 1.00  | n3 = 1.516 | v3 = 64.1 |
|    |    | r6 = 307.29  | d6 = 0.65  |            |           |
|    |    | r7 = 10.30   | d7 = 2.72  | n4 = 1.517 | v4 = 52.4 |
|    |    | r8 = −5.50   | d8 = 0.43  |            |           |
|    | ST | r9 = ∞       | d9 = 1.31  |            |           |
|    |    | r10 = 13.48  | d10 = 1.17 | n5 = 1.487 | v5 = 70.2 |
|    |    | r11 = 12.92  | d11 = 0.51 |            |           |
|    |    | r12 = 9.70   | d12 = 2.75 | n6 = 1.691 | v6 = 54.8 |
|    |    | r13 = −5.08  | d13 = 0.33 |            |           |
|    |    | r14 = −4.01  | d14 = 1.00 | n7 = 1.946 | v7 = 18.0 |
|    |    | r15 = −9.44  | d15 = 0.40 |            |           |
| *  |    | r16 = 17.10  | d16 = 2.89 | n8 = 1.583 | v8 = 59.5 |
| *  |    | r17 = −150.00| d17 = 1.21 |            |           |
|    |    | r18 = ∞      | d18 = 0.65 | n9 = 1.560 | v9 = 56.0 |
|    |    | r19 = ∞      | d19 = 1.48 |            |           |
|    |    | r20 = ∞      | d20 = 0.30 | n10 = 1.500| v10 = 63.0|
|    |    | r21 = ∞      | d21 = 0.20 |            |           |

*r1 has asterisk as well.

TABLE 4-continued (NUMERICAL EXAMPLE 4)

(B) ASPHERICAL COEFFICIENT

| | K | A | B | C | D | E | F | G |
|---|---|---|---|---|---|---|---|---|
| r1 | 0 | 3.60E−03 | −1.81E−04 | 5.38E−06 | −1.01E−07 | 1.07E−09 | −4.71E−12 | 0 |
| r2 | −1.6313473 | −3.27E−04 | 7.43E−04 | −1.10E−04 | 6.21E−06 | −1.63E−07 | 1.74E−09 | 0 |
| r3 | −1.8060312 | −7.53E−03 | −3.28E−04 | 7.89E−05 | −3.92E−06 | 6.32E−08 | 0 | 0 |
| r4 | −0.7790764 | −8.30E−03 | 1.69E−04 | 2.68E−06 | 6.30E−05 | −1.56E−05 | 1.58E−06 | −5.338E−08 |
| r16 | 0 | −2.16E−03 | 6.60E−05 | −4.18E−06 | 4.47E−07 | −1.01E−08 | 0 | 0 |
| r17 | 0 | −5.32E−03 | −2.89E−05 | 1.84E−05 | −1.13E−06 | 3.48E−08 | −3.23E−10 | 0 |

(C) VALUES OF INEQUALITIES

| | |
|---|---|
| (1) | 0.67 |
| (2) | 3.21 |
| (3) | 90 |
| (4) | 1.22 |

REFERENCE VALUE

| | |
|---|---|
| yi | 5.07 |
| yL1 | 7.56 |
| f1 | −6.42 |
| f2 | 20.63 |
| ymax | 3.65 |

Figure 15:
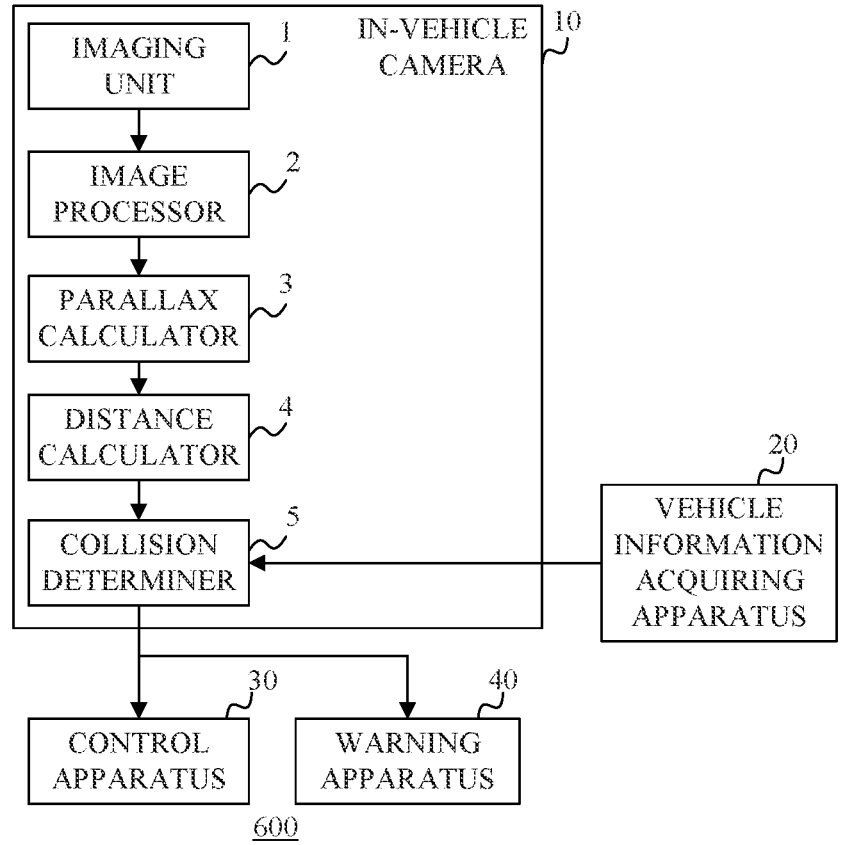
FIG. 15 is a block diagram of an in-vehicle system using the optical system according to each example.

FIG. 15 illustrates a configuration of an in-vehicle camera 10 using the optical system according to any one of the above examples for an imaging optical system, and an in-vehicle system (driving support device) 600 having the same. The in-vehicle system 600 is a system held by a moving body (moving apparatus) that is movable such as an automobile (vehicle), and configured to support driving (steering) of the vehicle based on image information around the vehicle acquired by the in-vehicle camera 10.

Figure 16:
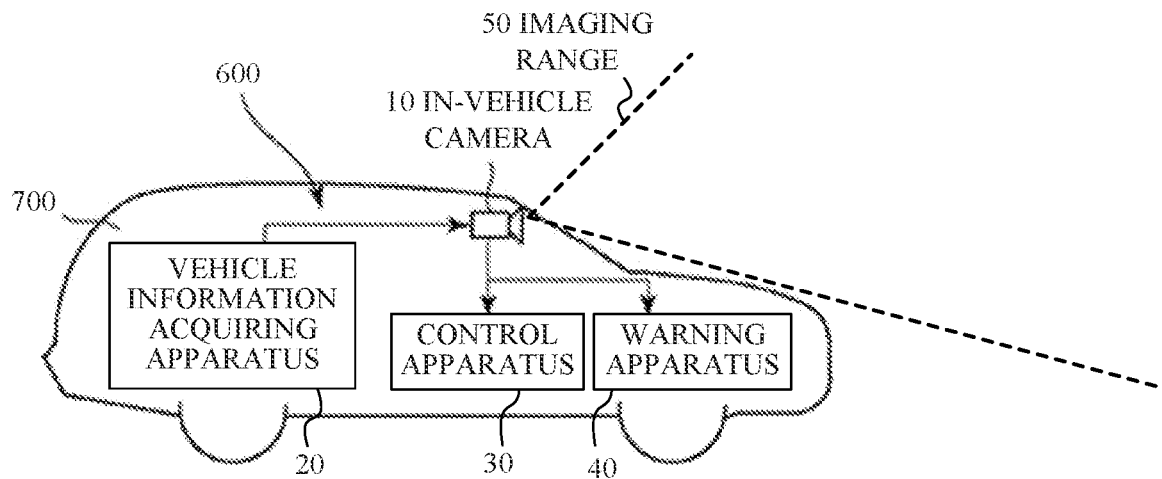
FIG. 16 is a schematic view of principal part of a vehicle including the in-vehicle system.

FIG. 16 illustrates a vehicle 700 as a moving apparatus that includes the in-vehicle system 600. While FIG. 16 illustrates an imaging range 50 of the in-vehicle camera 10 set to the front of the vehicle 700, the imaging range 50 may be set to the rear or side of the vehicle 700.

As illustrated in FIG. 16, the in-vehicle system 600 includes the in-vehicle camera 10, a vehicle information acquiring apparatus 20, a control apparatus (controller, ECU: electronic control unit) 30, and a warning apparatus (warning unit) 40. The in-vehicle camera 10 includes an imaging unit 1, an image processor 2, a parallax calculator 3, a distance acquirer 4, and a collision determiner 5. The image processor 2, the parallax calculator 3, the distance acquirer 4, and the collision determiner 5 constitute a processing unit. The imaging unit 1 includes the optical system according to any one of the above examples and an image sensor.

Figure 17:
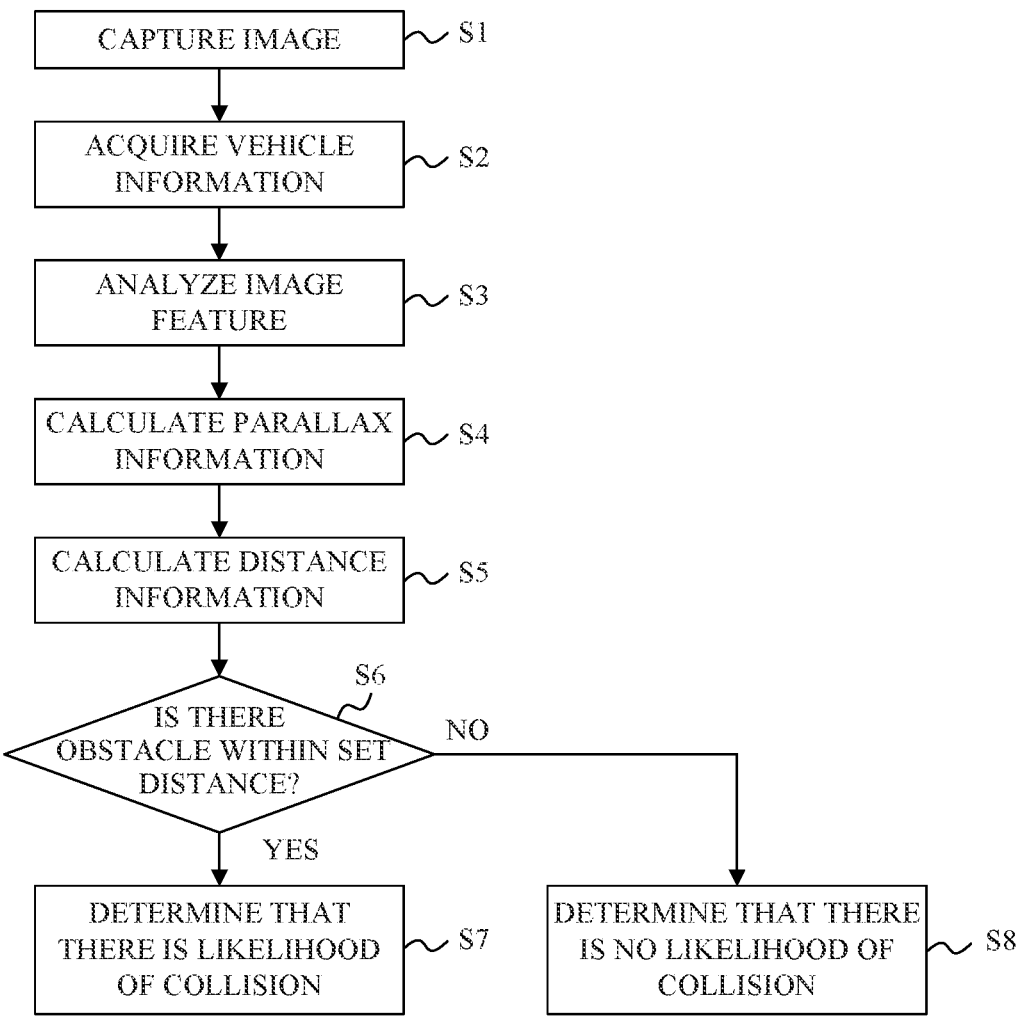
FIG. 17 is a flowchart showing an operation example of the in-vehicle system.

A flowchart of FIG. 17 illustrates an operation example of the in-vehicle system 600. In the step S1, the in-vehicle system 600 images, using the imaging unit 1, an object such as an obstacle or a pedestrian around the vehicle, and acquires a plurality of image data (parallax image data).

In the step S2, vehicle information is acquired by the vehicle information acquiring apparatus 20. The vehicle information is information including a vehicle speed, a yaw rate, a steering angle, and the like of the vehicle.

In the step S3, the image processor 2 performs image processing for the plurality of image data acquired by the imaging unit 1. More specifically, the image feature analysis is performed to analyze a feature amount such as an edge amount, an edge direction, and a density value in image data. The image feature analysis may be performed for each of the plurality of image data, or may be performed only for part of the plurality of image data.

In the step S4, the parallax calculator 3 calculates the parallax (image shift) information between the plurality of image data acquired by the imaging unit 1. A method for calculating the parallax information can use a known method such as the SSDA method or the area correlation method, and a description thereof will be omitted. The steps S2, S3, and S4 may be performed in this order, or may be processed in parallel.

In the step S5, the distance acquirer 4 acquires (calculates) the distance information with the object imaged by the imaging unit 1. The distance information can be calculated based on the parallax information calculated by the parallax calculator 3 and the internal parameters and external parameters of the imaging unit 1. The distance information is information on a relative position with the object such as a distance from the object, a defocus amount, an image shift amount, etc., and may directly represent the distance value of the object in the image or indirectly represent information corresponding to the distance value.

Then, in the step S6, the collision determiner 5 determines whether or not the distance to the object is included in the preset distance range using the vehicle information acquired by the vehicle information acquiring apparatus 20 or the distance information calculated by the distance acquirer 4. This configuration can determine whether or not the object exists within the set distance around the vehicle, and determine a likelihood of collision between the vehicle and the object. The collision determiner 5 determines that "there is a likelihood of collision" (step 7) when the object exists within the set distance, and determines that there is no likelihood of collision (step 8) when the object does not exist within the set distance.

Next, when the collision determiner 5 determines that "there is a likelihood of collision," the collision determiner 5 notifies (transmits) the determination result to the control apparatus 30 and the warning apparatus 40. At this time, the control apparatus 30 controls the vehicle based on the determination result of the collision determiner 5 (step S6), and the warning apparatus 40 provides warning to the vehicle user (driver, passenger) (step 7) based on the determination result of the collision determiner 5. The notification of the determination result may be made to at least one of the control apparatus 30 and the warning apparatus 40.

The control apparatus 30 can control moving of the vehicle by outputting a control signal to a driving unit (engine, motor, etc.) in the vehicle. For example, the control apparatus 30 generates a control signal for hitting the brakes, returning the gas pedal, turning the steering wheel, and applying the braking force to each wheel in the vehicle, and makes a control over the vehicle to suppress an output of the engine or the motor. The warning apparatus 40 gives a warning to the user, for example, by issuing a warning sound (alert), displaying warning information on a screen of a car navigation system, or giving vibrations to the seat belt or steering wheel.

According to the in-vehicle system 600 described above, the above processing can effectively detect the object and avoid a collision between the vehicle and the object. In particular, by applying the optical system according to any one of the above examples to the in-vehicle system 600, the entire in-vehicle camera 10 can be made smaller with an improved freedom degree of the arrangement, detect the object, and determine the likelihood of collision at a wide angle of view.

Various methods can be used to calculate the distance information. As an example, a pupil dividing type image sensor that includes a plurality of pixel units regularly arranged in a two-dimensional array is used for the image sensor in the imaging unit 1. In the pupil dividing type image sensor, one pixel unit includes a microlens and a plurality of photoelectric conversion units, receives a pair of light beams that have passed through different areas in the pupil of the optical system, and outputs a pair of image data from each photoelectric conversion unit.

An image shift amount of each area is calculated by the correlation calculation between the pair of image data, and the image shift map data representing a distribution of the image shift amount is calculated by the distance acquirer 4. Alternatively, the distance acquirer 4 may further convert the image shift amount into a defocus amount and generate defocus map data representing a distribution of the defocus amount (distribution on the two-dimensional plane of the captured image). The distance acquirer 4 may acquire the distance map data of the distance to the object converted from the defocus amount.

Each of the in-vehicle system 600 and the mobile apparatus 700 may include a notification apparatus (notifier) configured to notify the manufacturer of the in-vehicle system, the seller (dealer) of the moving apparatus, and the like of the fact that the moving apparatus 700 has collided with the obstacle. For example, the notification apparatus can use a device that transmits information (collision information) on a collision between the moving apparatus 700 and the obstacle to a preset external notification destination by e-mail or the like.

Thus, when the collision information is automatically notified by the notification apparatus, measures such as the inspection and repair can be immediately taken after the collision. The notification destination of the collision information may be an arbitrary destination set by the user, such as an insurance company, a medical institution, and the police. The notification apparatus may be configured so as to notify not only the collision information but also the failure information of each component and consumption information of consumables. The presence or absence of the collision may be detected by using the distance information acquired based on the output from the light receiving unit 2 described above, or by another detector (sensor).

In this description, the in-vehicle system 600 is applied to a driving support (collision damage reduction), but the present invention is not limited to this example, and the in-vehicle system 600 is applicable to the cruise control (including adaptive cruise control) and automatic driving. The in-vehicle system 600 is applicable not only to a vehicle such as an automobile but also to a moving body such as a ship, an aircraft, or an industrial robot. It is applicable not only to the moving body but also to various devices that utilize an object recognition such as an intelligent transportation system (ITS).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above examples can provide an optical system having a projection characteristic compatible with the fisheye lens and the telephoto lens, a sufficient angle of view, and sufficient center and peripheral resolutions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-011190, filed on Jan. 27, 2021, which is hereby incorporated by reference herein in its entirety.

What is claimed is:

1. An optical system comprising:
  a first lens disposed closest to an enlargement conjugate position;
  a second lens adjacent to the first lens;
  a diaphragm disposed closer to a reduction conjugate position than the second lens; and
  a final lens disposed closest to the reduction conjugate position, wherein each of the first lens, the second lens, and the final lens has an aspherical surface, wherein the aspherical surface of each of the first and second lenses has an inflection point, wherein an imaging magnification is different between a first area of the optical system and a second area on a periphery side of the first area, and wherein the following inequality is satisfied:

$$0.6 \leq f \sin \theta_{max}/y_{max} \leq 2.4$$

where θ max is a maximum half angle of view of the optical system, and ymax is a maximum image height of the optical system.

2. The optical system of claim 1, wherein the aspherical surface of at least one of the first and second lenses has a plurality of inflection points.

3. The optical system according to claim 1, wherein the aspherical surface of at least one of the first and second lenses has, in order from an optical axis side to a periphery side, a convex shape facing an enlargement conjugate side, a concave shape facing the enlargement conjugate side, and a convex shape facing the enlargement conjugate side.

4. The optical system according to claim 1, wherein at least three out of four surfaces of the first and second lenses are aspherical surfaces having inflection points.

5. The optical system according to claim 1, wherein the first lens has aspherical surfaces on both sides.

6. The optical system according to claim 1, wherein the following inequality is satisfied:

$$0.3 \leq |yi/yL1| < 1.0$$

where yi is a distance in a radial direction from an optical axis to the inflection point of the aspherical surface of the first lens, and yL1 is an effective radius of the first lens.

7. The optical system according to claim 1, wherein each of the first and second lenses has a meniscus shape.

8. The optical system according to claim 1, wherein the first lens has a negative refractive power, and the second lens has a positive refractive power.

9. The optical system according to claim 1, wherein the following inequality is satisfied:

$$0.1 \leq |f2/f1| \leq 6.0$$

where f1 is a focal length of the first lens, and f2 is a focal length of the second lens.

10. The optical system according to claim 1, wherein the aspherical surface of the second lens has, in order from an optical axis side to a periphery side, a convex shape facing an enlargement conjugate side and a concave shape facing the enlargement conjugate side.

11. The optical system according to claim 1, wherein the aspherical surface of the final lens has an inflection point.

12. The optical system according to claim 1, wherein the final lens has a positive refractive power.

13. The optical system according to claim 1, wherein the following inequality is satisfied:

$$\theta_{max} \geq 70°$$

where θ max is a maximum half angle of view of the optical system.

14. The optical system according to claim 1, wherein the optical system comprises, in order from an enlargement conjugate side to the reduction conjugate side, the first lens, the second lens, the third lens, a fourth lens, a fifth lens, a sixth lens, and the final lens.

15. The optical system according to claim 14, wherein the diaphragm is disposed between the fourth lens and the fifth lens.

16. The optical system according to claim 14, further comprising a seventh lens disposed on the reduction conjugate side of the sixth lens.

17. An image pickup apparatus comprising:
the optical system according to claim 1; and
an image sensor configured to image an object via the optical system.

18. An in-vehicle system comprising:
the image pickup apparatus according to claim 17; and
a determiner configured to determine a likelihood of collision between a vehicle and the object based on distance information of the object acquired by the image pickup apparatus.

19. A moving apparatus comprising the image pickup apparatus according to claim 17 and movable while holding the image pickup apparatus.

20. An optical system comprising:
a first lens disposed closest to an enlargement conjugate position;
a second lens adjacent to the first lens;
a diaphragm disposed closer to a reduction conjugate position than the second lens; and
a final lens disposed closest to the reduction conjugate position,
wherein each of the first lens, the second lens, and the final lens has an aspherical surface,
wherein the aspherical surface of each of the first and second lenses has an inflection point,
wherein an imaging magnification is different between a first area of the optical system and a second area on a periphery side of the first area, and
wherein the final lens has a positive refractive power.

21. An optical system comprising:
a first lens disposed closest to an enlargement conjugate position;
a second lens adjacent to the first lens;
a diaphragm disposed closer to a reduction conjugate position than the second lens; and
a final lens disposed closest to the reduction conjugate position,
wherein each of the first lens, the second lens, and the final lens has an aspherical surface,
wherein the aspherical surface of each of the first and second lenses has an inflection point,
wherein an imaging magnification is different between a first area of the optical system and a second area on a periphery side of the first area, and
wherein the following inequality is satisfied:

$$\theta_{max} \geq 70°$$

where θ max is a maximum half angle of view of the optical system.

* * * * *